United States Patent
Sull et al.

(10) Patent No.: US 7,471,834 B2
(45) Date of Patent: Dec. 30, 2008

(54) RAPID PRODUCTION OF REDUCED-SIZE IMAGES FROM COMPRESSED VIDEO STREAMS

(75) Inventors: Sanghoon Sull, Seoul (KR); Sungjoo Suh, Busan (KR); Jung Rim Kim, Seoul (KR); Seong Soo Chun, Songnam (KR)

(73) Assignee: VMark, Inc., Palo Alto, CA (US)

( * ) Notice: Subject to any disclaimer, the term of this patent is extended or adjusted under 35 U.S.C. 154(b) by 1022 days.

(21) Appl. No.: 10/361,794

(22) Filed: Feb. 10, 2003

(65) Prior Publication Data

US 2004/0126021 A1 Jul. 1, 2004

Related U.S. Application Data

(63) Continuation-in-part of application No. 09/911,293, filed on Jul. 23, 2001, said application No. 10/361,794 is a continuation-in-part of application No. PCT/US01/23631, filed on Jul. 23, 2001.

(60) Provisional application No. 60/359,564, filed on Feb. 25, 2002, provisional application No. 60/291,728, filed on May 17, 2001, provisional application No. 60/271,908, filed on Feb. 27, 2001, provisional application No. 60/222,373, filed on Jul. 31, 2000, provisional application No. 60/221,843, filed on Jul. 28, 2000, provisional application No. 60/221,394, filed on Jul. 24, 2000.

(51) Int. Cl.
G06K 9/36 (2006.01)
H04N 7/18 (2006.01)
G06K 9/46 (2006.01)

(52) U.S. Cl. .................. 382/232; 375/240

(58) Field of Classification Search ............ 382/232, 382/233, 235, 236, 240, 248, 250, 251, 253; 386/68; 375/240.03, 240.11, 240.16, 240.2, 375/240.22, 240.24, 240.25
See application file for complete search history.

(56) References Cited

U.S. PATENT DOCUMENTS 5,375,168 A * 12/1994 Kudelski .............. 380/214

(Continued)

FOREIGN PATENT DOCUMENTS

KR 10-0313713 10/2001

OTHER PUBLICATIONS

"Manipulation and compositing of MC-DCT compressed video" by S. F. Chang and D. G. Messerschmitt, IEEE Journal of Selected Areas in Communications, vol. 13, No. 1, Jan. 1995, pp. 1-11.

(Continued)

*Primary Examiner*—Amir Alavi
(74) *Attorney, Agent, or Firm*—Jones Day; Edward L. Pencoske

(57) ABSTRACT

Methods for fast generating spatially reduced-size images directly from compressed video streams supporting the coding of interlaced frames through transform coding and motion compensation. A sequence of reduced-size images are rapidly generated from compressed video streams by efficiently combining the steps of inverse transform, down-sampling and construction of each field image. The construction of reduced-size field images also allows the efficient motion compensation. The fast generation of reduced-size images is applicable to a variety of low-cost applications such as video browsing, video summary, fast thumbnail playback and video indexing.

18 Claims, 21 Drawing Sheets

U.S. PATENT DOCUMENTS

| | | | | |
|---|---|---|---|---|
| 5,708,732 | A | 1/1998 | Merhav et al. | 382/232 |
| 6,104,753 | A * | 8/2000 | Kim et al. | 375/240.16 |
| 6,278,446 | B1 | 8/2001 | Liou et al. | 345/328 |
| 6,381,278 | B1 | 4/2002 | Shin et al. | 375/240.16 |
| 6,445,828 | B1 | 9/2002 | Yim | 382/250 |
| 6,449,392 | B1 | 9/2002 | Divarkaran et al. | 382/235 |
| 6,532,309 | B1 * | 3/2003 | Sato et al. | 382/248 |
| 6,549,245 | B1 | 4/2003 | Lee et al. | 348/700 |
| 6,671,413 | B1 * | 12/2003 | Pearlman et al. | 382/240 |
| 2001/0043792 | A1 * | 11/2001 | Mishima et al. | 386/68 |
| 2002/0196853 | A1 * | 12/2002 | Liang et al. | 375/240.16 |
| 2003/0185456 | A1 * | 10/2003 | Sato et al. | 382/250 |
| 2004/0126021 | A1 * | 7/2004 | Sull et al. | 382/233 |
| 2005/0265610 | A1 * | 12/2005 | Natarajan et al. | 382/235 |

OTHER PUBLICATIONS

"On the extraction of DC sequences from MPEG compressed video," by B. L. Yeo and B. Liu, Proc. Int. Conf. Image Processing, vol. II, 1995, pp. 260-263.

"A Fast Algorithm for DCT-Domain Inverse Motion Compensation Based on Shared Information in a Macroblock" by J. Song and B-L. Yeo, IEEE Trans. Circuits and Systems for Video Technology, vol. 10, No. 5 Aug. 2000, pp. 767-775.

"An efficient graphical shot verifier incorporating visual rhythm", in Proceedings of IEEE International Conference on Multimedia Computing and Systems, H. Kim, J. Lee and S. M. Song, pp. 827-834, Jun., 1999.

"Fast Extraction of Spatially Reduced Image Sequences from MPEG-2 Compressed Video," by J. Song and B. L. Yeo, IEEE Trans. Circuits Syst. Video Technol.,.vol. 9, 1999, pp. 1100-1114.

* cited by examiner

RAPID PRODUCTION OF REDUCED-SIZE IMAGES FROM COMPRESSED VIDEO STREAMS

CROSS-REFERENCE TO RELATED APPLICATIONS

This is a continuation-in-part of U.S. patent application Ser. No. 09/911,293 filed Jul. 23, 2001 (published as U.S. Ser. No. 2002/0069218A1 on Jun. 6, 2002), which is a non-provisional of:

provisional application No. 60/221,394 filed Jul. 24, 2000;
provisional application No. 60/221,843 filed Jul. 28, 2000;
provisional application No. 60/222,373 filed Jul. 31, 2000;
provisional application No. 60/271,908 filed Feb. 27, 2001; and
provisional application No. 60/291,728 filed May 17, 2001.

This is a continuation-in-part of PCT Patent Application No. PCT/US01/23631 filed Jul. 23, 2001 (Published as WO 02/08948, 31 Jan. 2002), which claims priority of the five provisional applications listed above.

This is a continuation-in-part (non-provisional) of U.S. Provisional Patent Application No. 60/359,564 filed Feb. 25, 2002.

TECHNICAL FIELD OF THE INVENTION

The invention relates to the processing of video signals in compressed video streams, and more particularly to producing reduced-sixe images ("thumbnails").

BACKGROUND OF THE INVENTION

Video compression is a technique for encoding a video "stream" or "bitstream" into a different encoded form (usually a more compact form) than its original representation. A video "stream" is an electronic representation of a moving picture image.

One of the more significant and best known video compression standards for encoding streaming video is the MPEG-2 standard, provided by the Moving Picture Experts Group, a working group of the ISO/IEC (International Organization for Standardization/International Engineering Consortium) in charge of the development of international standards for compression, decompression, processing, and coded representation of moving pictures, audio and their combination. The MPEG-2 video compression standard, officially designated ISO/IEC 13818 (currently in 9 parts of which the first three have reached International Standard status), is widely known and employed by those involved in motion video applications. The ISO (International Organization for Standardization) has offices at 1 rue de Varembé, Case postale 56, CH-1211 Geneva 20, Switzerland. The IEC (International Engineering Consortium) has offices at 549 West Randolph Street, Suite 600, Chicago, Ill. 60661-2208 USA.

The MPEG-2 video compression standard achieves high data compression ratios by producing information for a full frame video image only every so often. These full-frame images, or "intra-coded" frames (pictures) are referred to as "I-frames"—each I-frame containing a complete description of a single video frame (image or picture) independent of any other frame. These "I-frame" images act as "anchor frames" (sometimes referred to as "key frames" or "reference frames") that serve as reference images within an MPEG-2 stream. Between the I-frames, delta-coding, motion compensation, and interpolative/predictive techniques are used to produce intervening frames. "Inter-coded" B-frames (bidirectionally-coded frames) and P-frames (predictive-coded frames) are examples of such "in-between" frames encoded between the I-frames, storing only information about differences between the intervening frames they represent with respect to the I-frames (reference frames).

The Advanced Television Systems Committee (ATSC) is an international, non-profit organization developing voluntary standards for digital television (TV) including digital high definition television (HDTV) and standard definition television (SDTV). The ATSC digital TV standard, Revision B (ATSC Standard A/53B) defines a standard for digital video based on MPEG-2 encoding, and allows video frames as large as 1920×1080 pixels/pels (2,073,600 pixels) at 20 Mbps, for example. The Digital Video Broadcasting Project (DVB—an industry-led consortium of over 300 broadcasters, manufacturers, network operators, software developers, regulatory bodies and others in over 35 countries) provides a similar international standard for digital TV. Real-time decoding of the large amounts of encoded digital data conveyed in digital television broadcasts requires considerable computational power. Typically, set-top boxes (STBs) and other consumer digital video devices such as personal video recorders (PVRs) accomplish such real-time decoding by employing dedicated hardware (e.g., dedicated MPEG-2 decoder chip or specialty decoding processor) for MPEG-2 decoding.

Among the most useful and important features of modern digital TV STBs are video browsing, visual bookmark capability, and picture-in-picture (PIP) capability. All of these features require that reduced-size versions of video frames be produced and displayed in one or more small areas of a display screen. For example, a plurality of reduced-size "thumbnail images" or "thumbnails" may be displayed as a set of index "tiles" on the display screen as a part of a video browsing function. These thumbnail images may be derived from stored video streams (e.g., stored in memory or on a disk drive), video streams being recorded, video streams being transmitted/broadcast, or obtained "on-the-fly" in real time from a video stream being displayed. Due to the high computational overhead associated with the derivation of reduced-size images, dedicated decoding hardware is also employed for these features, often requiring completely separate decoding hardware dedicated to reduced-size image production.

The MPEG-2 Video Standard supports both progressive scanned video and interlaced scanned video. In progressive scanning, video is displayed as a stream of raster-scanned frames. Each frame contains a complete screen-full of image data, with scanlines displayed in sequential order from top to bottom on the display. The "frame rate" specifies the number of frames per second in the video stream. In interlaced scanning, video is displayed as a stream of alternating, interlaced (or interleaved) top and bottom raster fields at twice the frame rate, with two fields making up each frame. The top fields (also called "upper fields" or "odd fields") contain video image data for odd numbered scanlines (starting at the top of the display with scanline number 1), while the bottom fields contain video image data for even numbered scanlines. The top and bottom fields are transmitted and displayed in alternating fashion, with each displayed frame comprising a top field and a bottom field. A single progressive frame has better spatial resolution than a single interlaced field, since it has a full screen's worth of scan lines. However, an interlaced stream actually has better temporal resolution than a progressive stream, since displays partial image fields twice as often.

The MPEG-2 Video Standard also supports both frame-based and field-based methodologies for Discrete Cosine Transform (DCT) block coding and motion prediction. A block coded by field DCT method typically has a larger motion component than a block coded by the frame DCT method.

FIGS. 1A and 1B show general methods for producing reduced-sized images for a block coded by frame DCT (FIG. 1A) and a block coded by field DCT (FIG. 1B), respectively.

FIG. 1A shows a process 100A for producing reduced-size images from frame-coded (i.e., progressive scanned) video. A frame of N×N DCT blocks 110A are processed by an inverse DCT (IDCT) 120 (thereby producing decoded N×N pixel blocks). Decoded N×N pixel blocks resulting from the IDCT are then downsampled by a downsampling process 130 to produce reduced-size M×M pixel blocks 140 (M is smaller than N). Throughout the various descriptions set forth herein, both M and N are nonzero integers.

"Downsampling" is a process whereby a reduced-size image is produced from a larger image, with each pixel in the reduced-size image corresponding to a respective group of pixels in the larger image.

FIG. 1B shows a similar process 110B for producing reduced-size images, for interlaced video. Field-coded DCT blocks 110B are processed by an inverse DCT (IDCT) transform 120 (thereby producing decoded N×N pixel blocks). The resulting decoded pixel blocks from odd and even fields are then collected and assembled into complete frame blocks by a de-interlacing process 150. After de-interlacing, a down-sampling process 130 produces M×M reduced-size images 140 (M is smaller than N).

Due to the fact that each frame and/or field must be completely decoded before it can be downsampled, the processes shown in FIGS. 1A and 1B are computationally inefficient, requiring heavy computation and memory space relative to the size of the image (reduced-size image) produced thereby.

DCT encoding stores image data as a set of frequency-domain coefficients, with higher-frequency coefficients contributing primarily to fine detail in the full-size frame/field image. It has been observed that since reduced-size images are too small to resolve the fine detail of full-size images, the information contained in higher-frequency coefficients is essentially superfluous in producing reducing reduced-size images, and can be discarded, thereby reducing the computational load in the IDCT process.

FIG. 1C illustrates a process 100C that takes advantage of this observation by discarding high frequency DCT coefficients prior to IDCT processing to reduce the computational load. In a N×N frame-based DCT block 110C, a selection process 160 eliminates and discards high frequency DCT coefficients prior to IDCT processing 120. Due to the reduced number of coefficients, the IDCT process 120 essentially becomes an M×M IDCT, producing an M×M reduced-size image without downsampling, thereby requiring considerably fewer transformation calculations than the N×N IDCTs of FIGS. 1A and 1B which include downsampling. This technique has the advantage of substantial reductions in memory usage and computational load.

For field-coded (interlaced) video, the method of FIG. 1C has the disadvantage that it does not take into account the fact that top field and bottom fields are formed at different instants of time, resulting in distortion/blurring in the reduced-sized images.

In the description that follows, a number of equations are set forth to clarify both the prior art and inventive techniques. Typically, the equations are labeled, with a sequential number in parentheses, such as "(1)", "(2)", etc., for easy reference back to the equation in subsequent text. No other meaning should be ascribed to these labels.

As an example of prior-art methods of downsampling, a process of taking an 8×8 pixel average is described. The "DC value" of an 8×8 pixel block is defined as:

$$DC \text{ value} = \frac{1}{8} \sum_{m=0}^{7} \sum_{n=0}^{7} s(m, n), \quad (1)$$

where s(m, n) represents a gray level or chrominance value at m-th row and n-th column in a 8×8 block. The DC value is 8 times the average of the 8×8 pixel values. In MPEG-1 encoding (a predecessor to and subset of MPEG-2 encoding), DC value extraction from intra-coded frames (I-frames) is a straightforward process. The first coefficient in each DCT block of an I-frame is a DC value. Obtaining DC values from P (predictive-coded) and B (bidirectionally-coded) frames is considerably more involved, requiring the additional step of motion compensation.

A method for DCT-domain (frequency domain) motion compensation was proposed in an article entitled "Manipulation and Compositing of MC-DCT compressed video" by S. F. Chang and D. G. Messerschmitt, IEEE Journal on Selected Areas in Communications, vol. 13, NO. 1, January 1995, pp. 1–11, where the DCT domain motion compensation was expressed as:

$$DCT(B) = \sum_{i=0}^{3} DCT(H_i)DCT(B_i)DCT(W_i), \quad (2)$$

where $$H_0 = \begin{pmatrix} 0 & I_{h_0} \\ 0 & 0 \end{pmatrix} \quad H_1 = \begin{pmatrix} 0 & I_{h_1} \\ 0 & 0 \end{pmatrix} \quad H_2 = \begin{pmatrix} 0 & 0 \\ I_{h_2} & 0 \end{pmatrix} \quad H_3 = \begin{pmatrix} 0 & 0 \\ I_{h_3} & 0 \end{pmatrix},$$

$$W_0 = \begin{pmatrix} 0 & 0 \\ I_{w_0} & 0 \end{pmatrix} \quad W_1 = \begin{pmatrix} 0 & I_{w_1} \\ 0 & 0 \end{pmatrix} \quad W_2 = \begin{pmatrix} 0 & 0 \\ I_{w_2} & 0 \end{pmatrix} \quad W_3 = \begin{pmatrix} 0 & I_{w_3} \\ 0 & 0 \end{pmatrix}$$

and the terms $I_{hi}$ and $I_{wi}$ represent $h_i \times h_i$ and $w_i \times w_i$ identity matrices, respectively. The term B—denotes a current target block to be reconstructed and the term $B_i$ (i=0,1,2,3) are neighboring blocks in a reference frame.

FIG. 2 is a graphical representation of this process of motion compensation illustrating derivation of a motion-compensated image 220 from a reference image 210. The reference image 210 comprises four image blocks 210A (B1), 210B (B2), 210C (B3) and 210D (B4). A block of pixels 212 overlapping the four image blocks 210A, 210B, 210C and 210D is "in motion" between the reference image 210 and the motion compensated image 220, representing a single block "B" (230, shaded) in the motion compensated image 220. Portions 212A, 212B, 212C, and 212D (shaded) of the block of pixels 212 overlap image blocks 210A, 210B, 210C and 210D, respectively. Portion 212A has a height h1 and a width w1. Portion 212B has a height h2 and a width w2. Portion 212C has a height h3 and a width w3. Portion 212D has a height h4 and a width w4.

Since the computation of equation (2) involves a large number of multiplications for DC image extraction, a first-order approximation scheme was proposed in an article entitled "On the extraction of DC sequences from MPEG compressed video," by B. L. Yeo and B. Liu, Proc. Int Conf. Image Processing, vol. II, 1995, pp. 260–263 to reduce computational complexities. The key result of this reference is expressed in the following equation, $$DC(B) = \sum_{i=0}^{3} \frac{h_i w_i}{64} DC(B_i), \quad (3)$$

where $DC(B)$ and $DC(B_i)$ represent DC values in the block B and $B_i$, respectively.

Because $h_i$ and $w_i$ can be precomputed, the computation of equation (3) requires at most four multiplications to calculate a DC value. However, this scheme does not consider the possibility of interlaced field encoding described in the MPEG-2 video standard.

DC extraction for MPEG-2 video was proposed in an article entitled "Fast Extraction of Spatially Reduced-sized image Sequences from MPEG-2 Compressed Video," by J. Song and B. L. Yeo, IEEE Trans. Circuits Syst. Video Technol., vol. 9, 1999, pp. 1100–1114. This reference presents a technique called "DC+2AC" for fast DC extraction from MPEG-2 video streams. A DC+2AC block is a block where all DCT coefficients except DC, $AC_{01}$ and $AC_{10}$ in an 8×8 DCT block are set to zero. After constructing the DC+2AC blocks from an I-frame (essentially a coefficient copying process), the DC+2AC blocks in P and B frames are constructed by using motion compensation (as defined in the MPEG-2 standard) and selected properties of the permutation matrix. This approach requires a single multiplication and 2.5 additions per field DCT coded 8×8 block to extract a DC image from I-frame.

To gain further speed improvements, a method for performing motion compensation on a macroblock basis was proposed in an article entitled "A Fast Algorithm for DCT-Domain Inverse Motion Compensation Based on Shared Information in a Macroblock", by J. Song and B-L. Yeo, IEEE Trans. Circuits and Systems for Video Technology, vol. 10, NO. 5 Aug. 2000, pp. 767–775. This technique is used on top of the DC+2AC scheme. This approach still requires many multiplications to extract a DC image sequence (i.e., a reduced-size image sequence) from P and B frames. Moreover, because the DC+2AC scheme calculates only one average pixel value for a whole 8×8 block and does not consider the temporal displacement between top and bottom interlaced fields, the resulting DC images can be blurred, especially when there is a rapid motion between top and bottom fields.

U.S. Pat. No. 5,708,732 ("Merhav"), entitled Fast DCT domain downsampling and inverse motion compensation, discloses another method requiring low computation to generate a reduced image. The Merhav patent discloses a computation scheme for video image downsizing in the DCT domain. The method described in the Merhav patent does not consider the existence of field DCT encoded macroblocks. Since many compressed video streams include both field and frame DCT encoded macroblocks, the method of the Merhav patent might cause a downsized image to be distorted for many compressed video streams.

U.S. Pat. No. 6,445,828 ("Yim"), entitled Transform Domain Resizing of an Image Compressed with Field Encoded Blocks, discloses a method that considers field DCT encoded macroblocks during the generation of reduced image. The Yim patent discloses a method for DCT domain image resizing with mixed field/frame DCT encoded macroblocks. The method described in the Yim patent simply averages top field and bottom field pixel values to obtain the downsized image in the DCT domain. More specifically, the method described in the Yim patent averages top field and bottom field pixel values after reordering pixels according to the mode of DCT encoded block. Even though the method of the Yim patent reorders pixels by considering mixed field/frame DCT encoded macroblocks, the method of the Yim patent does not consider the fact that top and bottom field are captured at the different time instants. Thus, the downsized image obtained by using the method of the Yim patent will cause an undesired artifact when there is a rapid motion between top and bottom fields.

One of the applications of reduced-size images is video indexing, whereby a plurality of reduced-size images are presented to a user, each on representing a miniature "snapshot" of a particular scene in a video stream. Once the digital video is indexed, more manageable and efficient forms of retrieval may be developed based on the index that facilitate storage and retrieval.

Generally, the first step in indexing a digital video stream is to temporally segment the input video into logical "scene" groupings—that is, to determine "shot boundaries" that occur within the video stream due to camera shot transitions. The temporally segmented shots can improve the storage and retrieval of visual data if keywords associated with the shots are also available.

Although abrupt scene changes are relatively easy to detect, it is typically more difficult to identify special effects, such as dissolve, wipe and cross-fade. Since these special effects are often used in conjunctions with the most important scene changes (from a content point of view), this represents a significant challenge to viable scene-change detection (shot detection).

In order to segment a video sequence into shots, a measure of the dissimilarity between two frames must be defined. This measure must return a high value only when two frames fall in different shots. Several researchers have used the dissimilarity measure based on the luminance or color histogram, correlogram (correlation histogram), or any other visual feature to match two frames. However, these approaches usually produce many false alarms. In fact, it is very hard for humans to exactly locate various types of shots (especially dissolves and wipes) in a video stream based solely upon this type of dissimilarity measurement. Further, this type of dissimilarity measurement computationally inefficient with respect to wide varieties of shapes, and the directions and patterns of various wipe effects. Therefore, it is important to develop a tool that enables human operator to efficiently verify the results of automatic shot detection where there usually might be many falsely detected and missing shots. Visual rhythm addresses many of these issues.

Visual rhythm is a process wherein a two-dimensional image representing a motion video stream is constructed. A video stream is essentially a temporal sequence of two-dimensional images, the temporal sequence providing an additional dimension—time. The visual image methodology uses selected pixel values from each frame (usually values along a sampling path which is a horizontal, vertical or diagonal line in the frame) as line images, stacking line images from subsequent frames alongside one another to produce a two-dimensional representation of a motion video sequence. The resultant image exhibits distinctive patterns—the "visual rhythm" of the video sequence—for many types of video editing effects, especially for all wipe-like effects which manifest themselves as readily distinguishable lines or curves, permitting relatively easy verification of automatically detected shots by a human operator (to identify and correct false and/or missing shot transitions) without actually playing the whole video sequence. Visual rhythm also contains visual features that enable automatic caption text detection, as described in an article entitled "An efficient graphical shot verifier incorporating visual rhythm", by H. Kim, J. Lee and S. M. Song, Proceedings of IEEE International Conference on Multimedia Computing and Systems, pp. 827–834, June, 1999.

Glossary

Unless otherwise noted, or as may be evident from the context of their usage, any terms, abbreviations, acronyms or scientific symbols and notations used herein are to be given their ordinary meaning in the technical discipline to which the invention most nearly pertains. The following terms, abbreviations and acronyms may be used in the description contained herein:

| | |
|---|---|
| AC block | A DCT block having only AC components, possibly a subset of the full set of AC components. |
| ATSC | Advanced Television Systems Committee |
| B-Frame | Bi-directionally-encoded predictive frame (also B Frame) |
| B-Picture | An image resulting from decoding a B-Frame (also B Picture) |
| CODEC | enCOder/DECoder |
| DC Value | A value related to the average value of a group of pixels. Also, more specifically, the zero spatial frequency component of a DCT-coded block representing the scaled average value of an 8 × 8 block of pixels. |
| DCT | Discrete Cosine Transformation. A type of frequency transform commonly used in image processing to convert between spatial-domain pixel data and frequency-domain spectral coefficient representations of images. The DCT is an invertible, discrete orthogonal transformation. The "forward DCT", or transformation from the spatial domain to the frequency domain is generally abbreviated "DCT". The reverse process or "inverse DCT" is generally abbreviated "IDCT". |
| DC coefficient | The DCT coefficient for which the frequency is zero in both dimensions. |
| DCT coefficient | The amplitude of a specific cosine basis function. |
| DC block | A DCT block with only a DC (zero frequency component) |
| DVB | Digital Video Broadcasting Project |
| DVR | Digital Video Recorder |
| H.264 | an encoding standard for multimedia applications promulgated by the International Telecommunication Union (ITU) |
| HDD | Hard Disc Drive |
| HDTV | High Definition Television |
| IDCT | inverse DCT (see DCT) |
| I-Frame | Intra-coded Frame. Represents a complete video frame image, independent of any other surrounding frames. (also I frame) |
| I-Picture | A frame image resulting from decoding an I-Frame. (also I Picture) |
| Mbps | mega (million) bits per second |
| MPEG | Motion Pictures Expert Group, a standards organization dedicated primarily to digital motion picture encoding |
| MPEG-2 | an encoding standard for digital television (officially designated as ISO/IEC 13818, in 9 parts) |
| MPEG-4 | an encoding standard for multimedia applications (officially designated as ISO/IEC 14496, in 6 parts) |
| Motion-JPEG | variant of MPEG |
| Mbps | mega (million) bits per second |
| P-Frame | Predictive-coded Frame. (also P Frame) |
| P-Picture | A frame image resulting from decoding a P-frame. (also P Picture) |
| PVR | personal video recorder |
| PIP | picture in picture |
| pixel | picture element (also "pel") |
| RAM | random access memory |
| SDTV | Standard Definition Television |
| STB | set-top box |
| thumbnail | a reduced-size representation of a larger picture (or frame, or image) |
| TV | television |
| Visual Rhythm | The visual rhythm of a video is a single image, that is, a two-dimensional abstraction of the entire 'three-dimensional' content of the video constructed by sampling certain group of pixels of each image sequence and temporally accumulating the samples along time. |

BRIEF DESCRIPTION (SUMMARY) OF THE INVENTION

It is a general object of the invention to provide an improved technique for producing reduced-size images from a video stream.

According to the invention, a method is provided for producing reduced-size images from a video stream. The method comprises determining a reduction factor for a reduced size image; selecting a reduced set of transform coefficients from each of a plurality of macroblocks by discarding higher-frequency coefficients; and performing an inverse transformation and field separation process on the selected coefficients to produce reduced-size pixels of the reduced size image.

According to the invention, a method is provided for producing a reduced-size images from a video stream. The method comprises determining DC values for frame encoded transform blocks within the video stream; determining half DC values for field encoded transform blocks within the video stream; and assigning pixel values in a reduced-size image based upon the DC values and half DC values.

According to the invention, a thumbnail generator is provided. The thumbnail generator comprises means for determining a reduction factor for a reduced size image; means for selecting a reduced set of transform coefficients from each of a plurality of macroblocks by discarding higher-frequency coefficients; and means for performing an inverse transformation and field separation process on the selected coefficients to produce reduced-size pixels of the reduced size image.

According to the invention, a system is provided for producing reduced size images from a video stream. The system comprises means for selecting coefficients; means for VLC-decoding the selected coefficients; means for dequantizing the selected coefficients; and means for producing reduced-size image pixel values from the selected coefficients.

The present invention provides a variety of related techniques for producing reduced-size images directly from compressed video streams, where the block-based compression mechanism supports both interlaced frame coding and field-based motion compensation. The techniques set forth herein dramatically reduce computational load by using "DC values" derived directly from encoded coefficients of the compression technique without going through the complete decoding process. Computational load is further reduced, in some cases, by extracting DC values only for a subset of encoded blocks in the video stream. By processing top and bottom field images separately, higher quality images are obtained than would otherwise be produced, greatly reducing blurring and motion artifacts due to motion between fields of a video frame. The techniques described herein provide for very fast production of reduced-sized images and are well suited to a wide variety of applications, including video browsing, video summary, fast thumbnail playback and video indexing.

One embodiment of the present invention provides for fast and efficient construction of visual rhythm image. Unlike conventional approaches that require complete frame decoding to sample pixels along a visual rhythm sampling path (e.g., a diagonal line in the frame), the present invention provides a technique that requires decoding of only a small subset of the pixels composing a frame for constructing the visual rhythm. Most modern video compression techniques adopt intraframe and interframe coding to reduce spatial and temporal redundancies. Once a set of pixels along a visual rhythm sampling path is identified, it is only necessary to decode those pixels in frames that are not referenced by other frames in interframe coding. This allows for fast construction of visual rhythm images for applications involving shot detection, caption text detection, and other similar visual rhythm applications.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings (figures). The drawings are intended to be illustrative, not limiting, and it should be understood that it is not intended to limit the invention to the illustrated embodiments.

Elements of the figures may be numbered as follows. The most significant digits (hundreds) of the reference number correspond to the figure number. For example, elements of FIG. 1 are typically numbered in the range of 100–199, and elements of FIG. 2 are typically numbered in the range of 200–299, and so forth. Similar elements throughout the figures may be referred to by similar reference numerals. For example, the element 199 in FIG. 1 may be similar (and, in some cases identical) to the element 299 in FIG. 2. Throughout the figures, each of a plurality of similar elements 199 may be referred to individually as 199a, 199b, 199c, etc. Such relationships, if any, between similar elements in the same or different figures will become apparent throughout the specification, including, if applicable, in the claims and abstract.

Light shading (cross-hatching) may be employed to help the reader distinguish between different ones of similar elements (e.g., adjacent pixels), or different portions of blocks.

The structure, operation, and advantages of the present preferred embodiment of the invention will become further apparent upon consideration of the following description taken in conjunction with the accompanying figures.

Figure 1A:
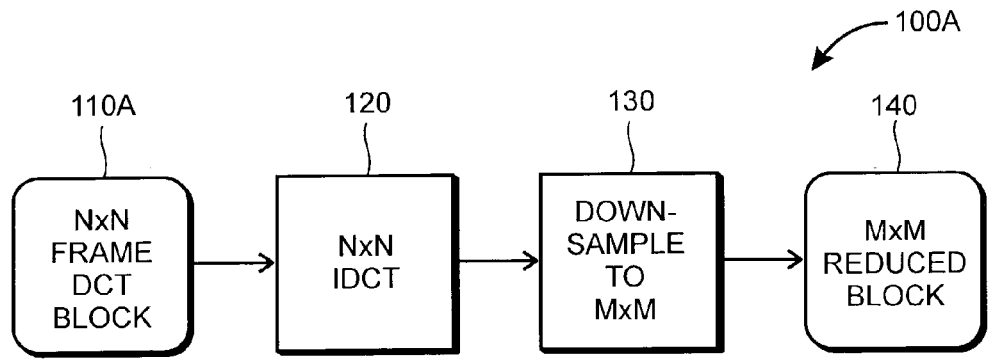
Figure 1B:
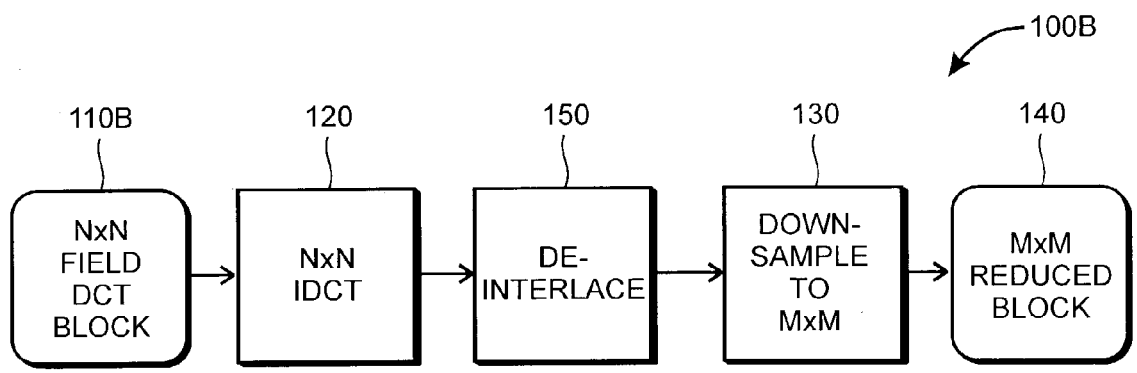
Figure 1C:
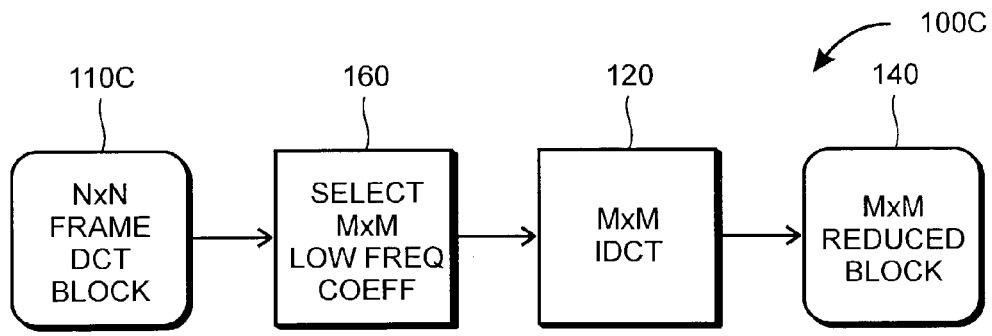

FIGS. 1A–1C are block diagrams of techniques for producing reduced-size images for DCT-coded images, according to the prior art.

Figure 2:
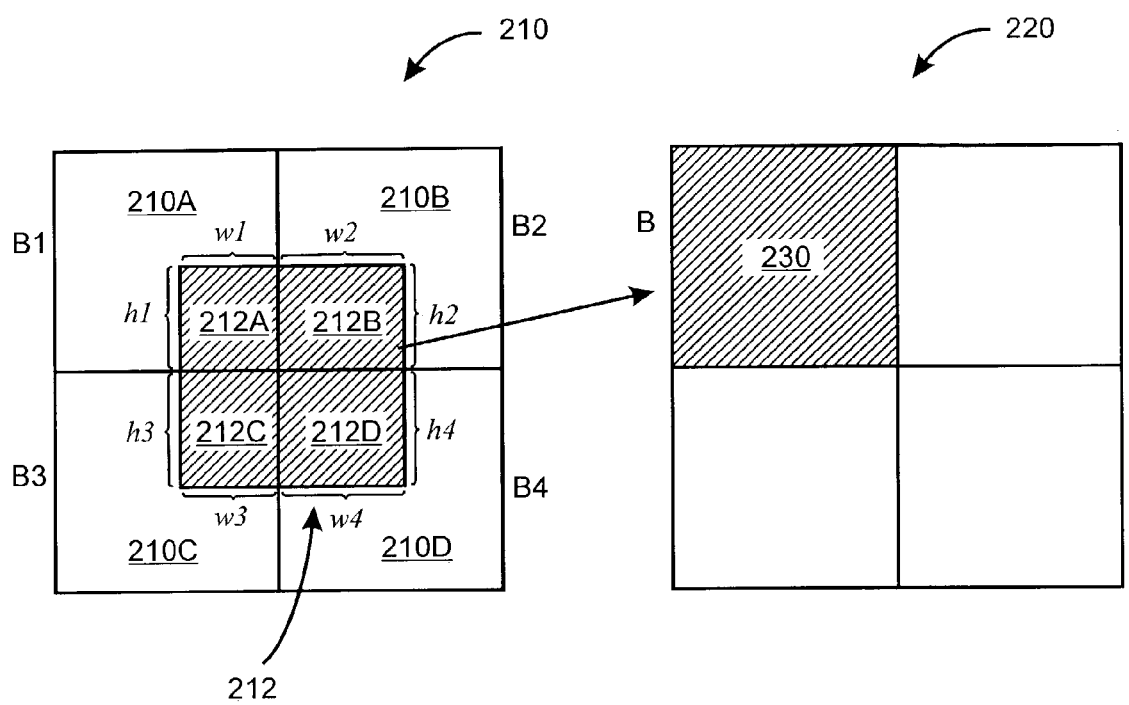

FIG. 2 is a graphical representation of a motion compensation process, according to the prior art.

Figure 3:
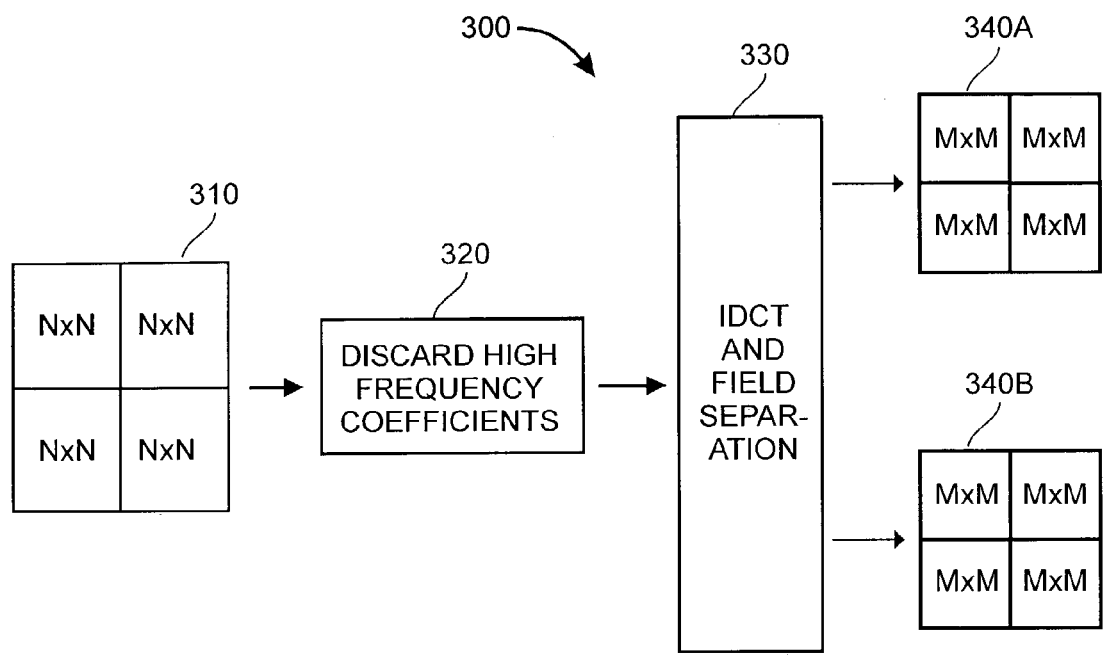

FIG. 3 is a block diagram of a technique for simultaneously producing reduced-size images and separating interlaced fields, according to the invention.

Figure 4:
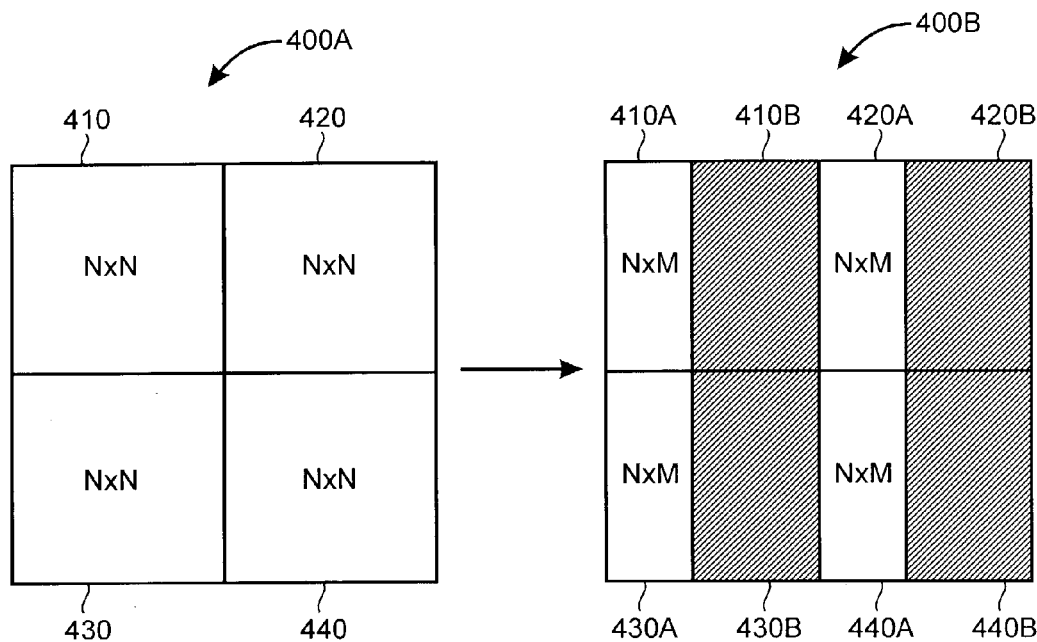

FIG. 4 is a diagram illustrating a technique for discarding high frequency coefficients when a macroblock is coded by frame DICT, according to the invention.

Figure 5:
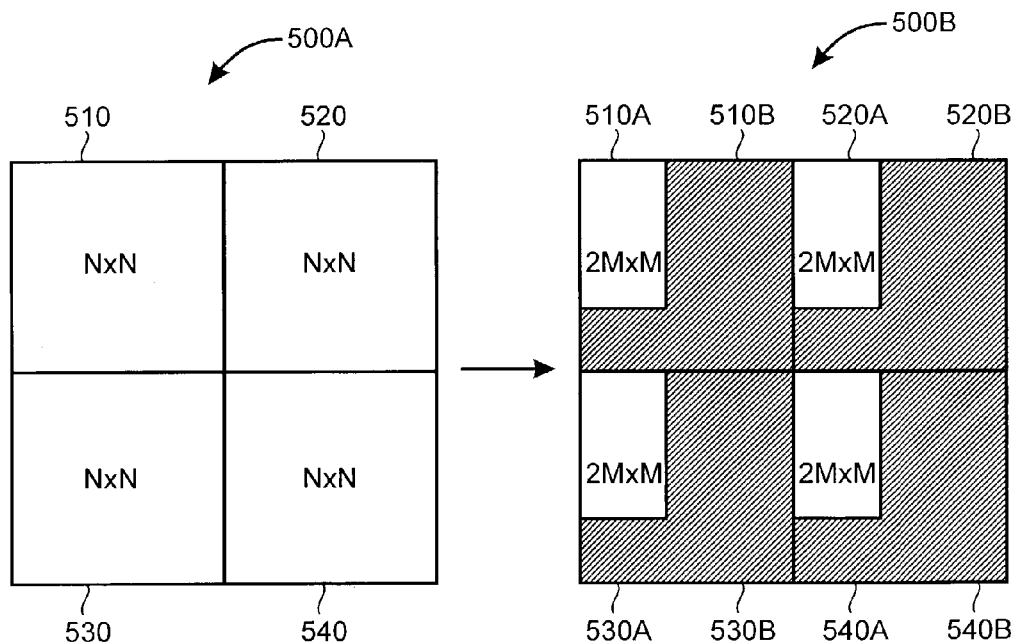

FIG. 5 is a diagram illustrating a technique for discarding high frequency coefficients when a macroblock is coded by the field DCT, according to the invention.

Figure 6A:
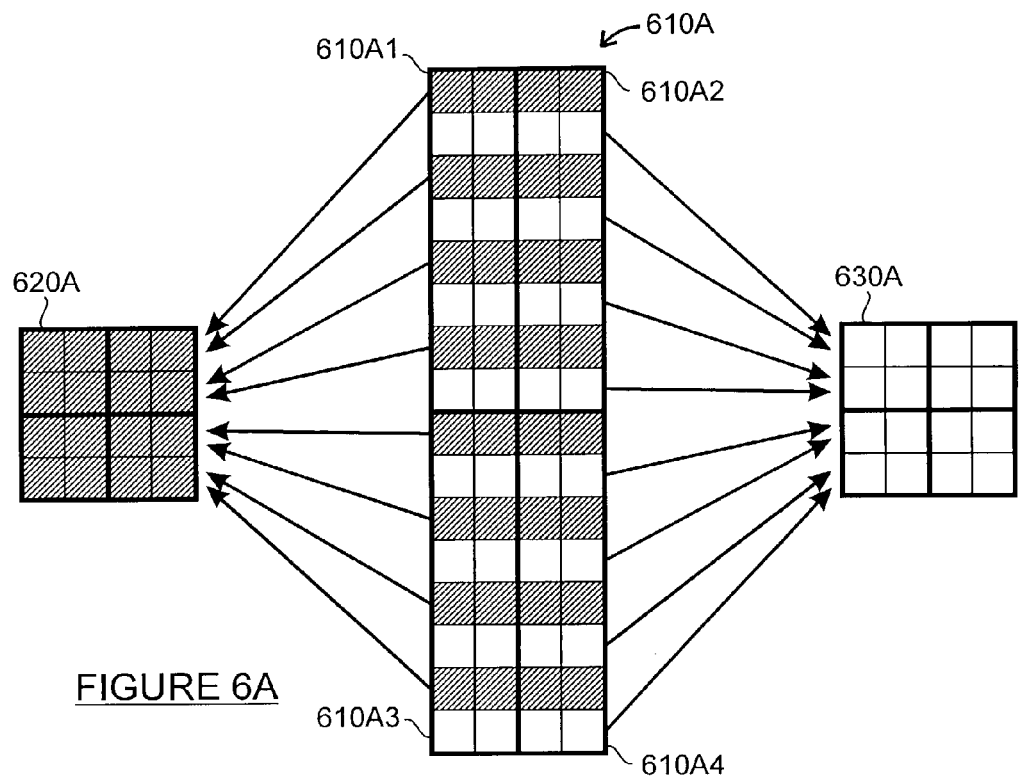

FIG. 6A is a diagram illustrating field separation for frame DCT coded macroblocks, according to the invention.

Figure 6B:
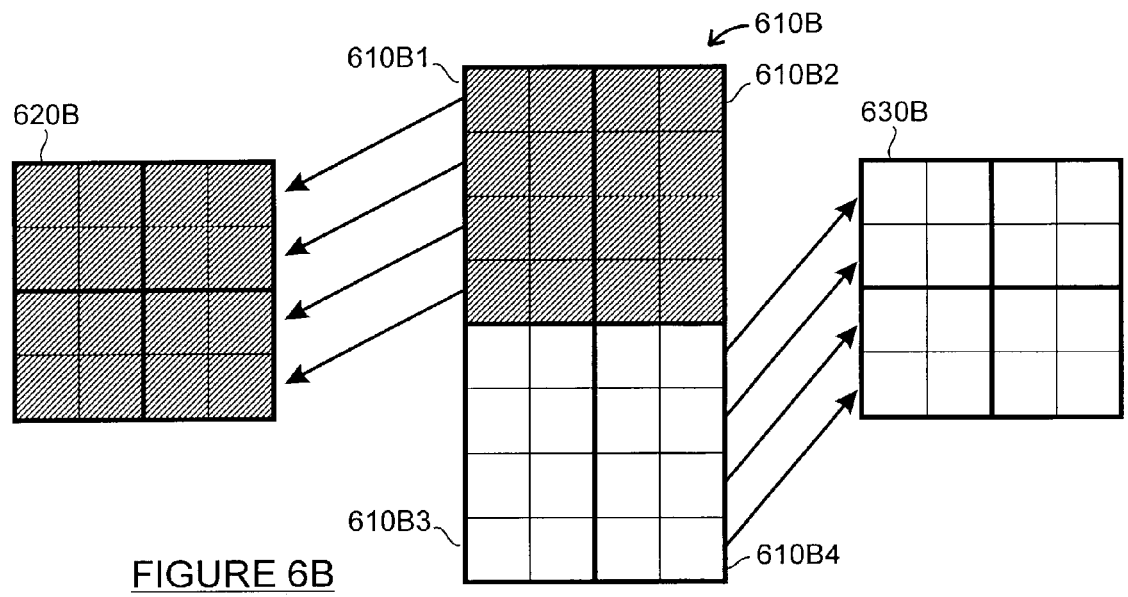

FIG. 6B is a diagram illustrating field separation for field DCT coded macroblocks, according to the invention.

Figure 7:
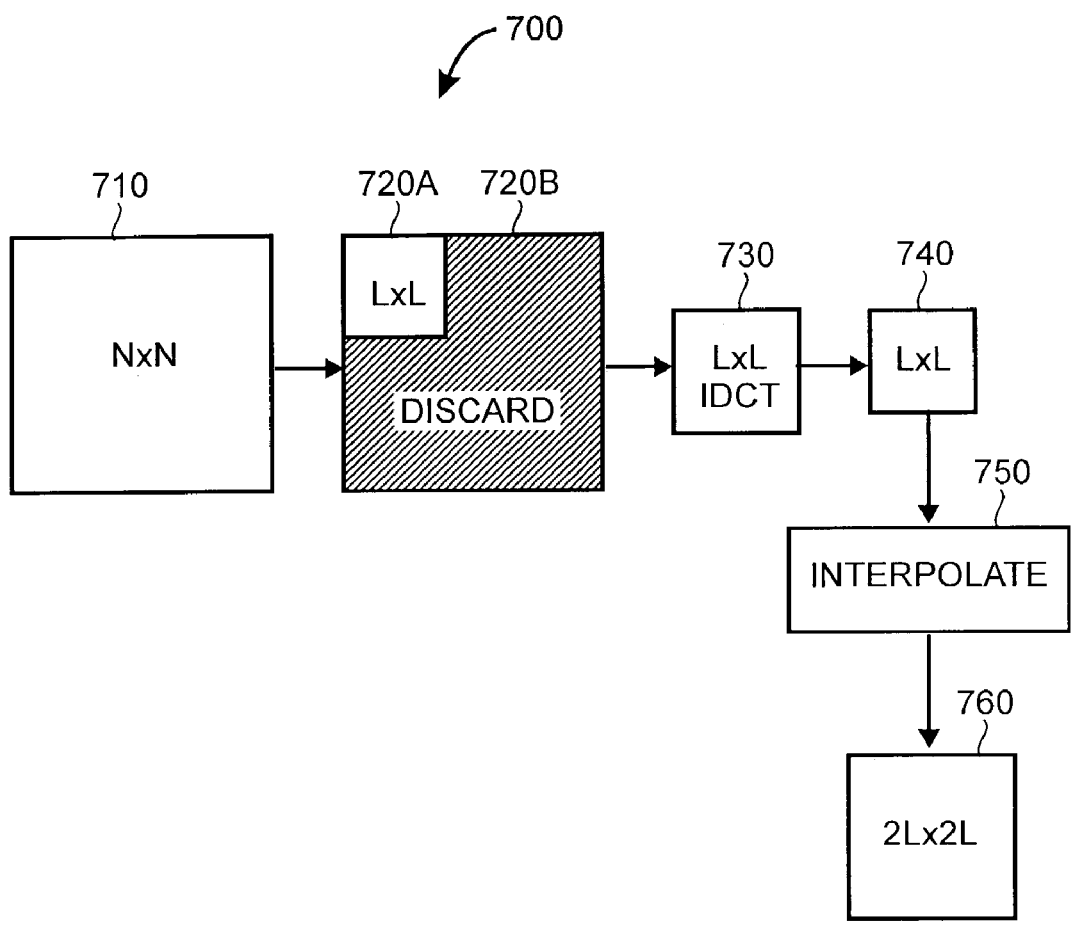

FIG. 7 is a block diagram of a process for producing chrominance information for reduced-size images, according to the invention.

Figure 8:
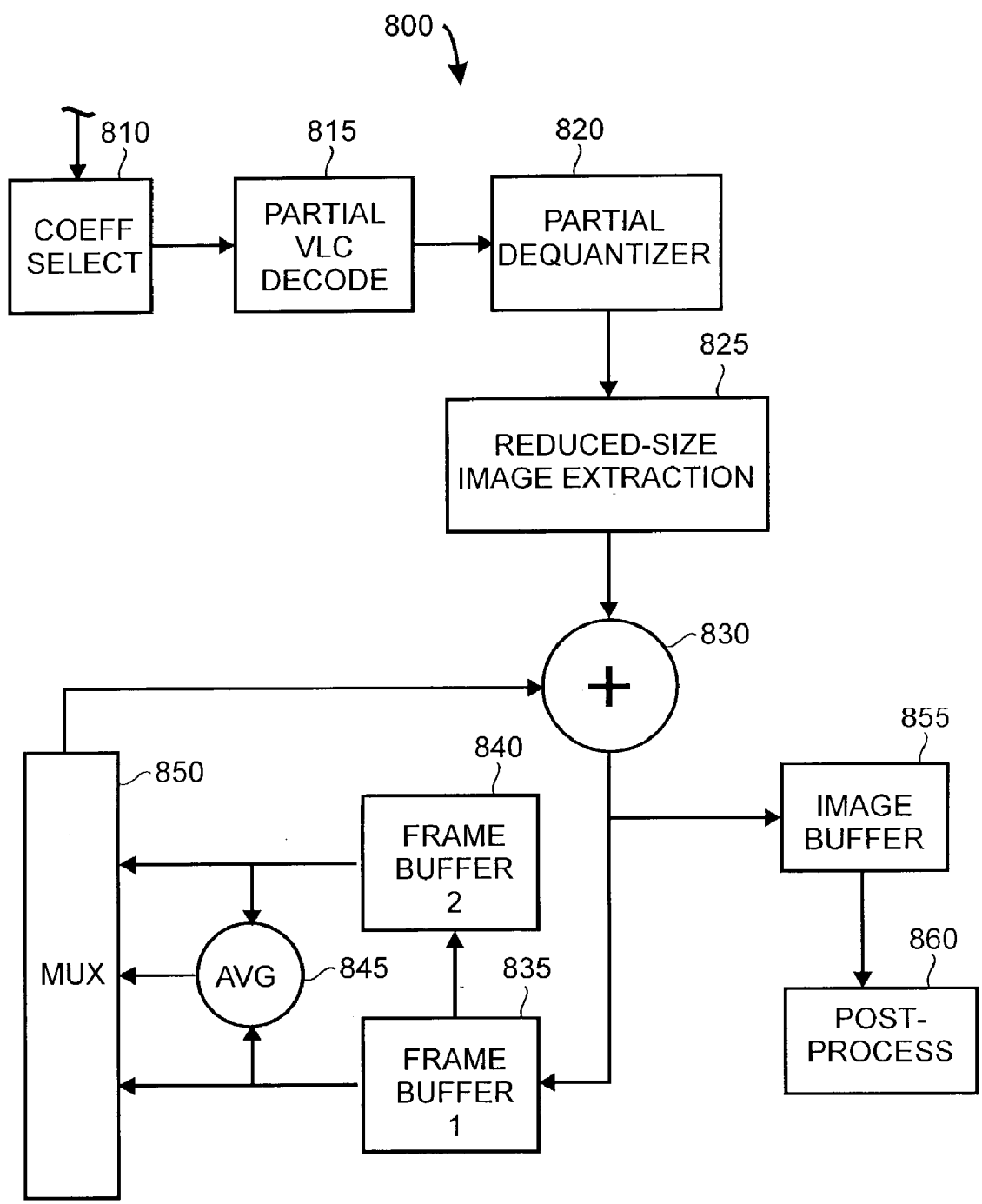

FIG. 8 is a block diagram of an embodiment of a system for producing reduced-size images, according to the invention.

Figure 9A:
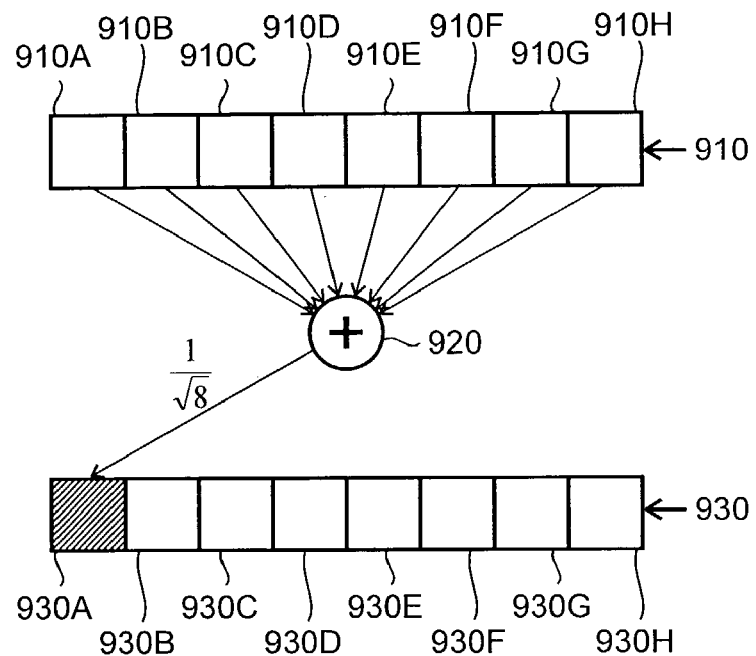

FIG. 9A is a diagram illustrating the calculation of a "DC" term for an 8-pixel array, according to the invention.

Figure 9B:
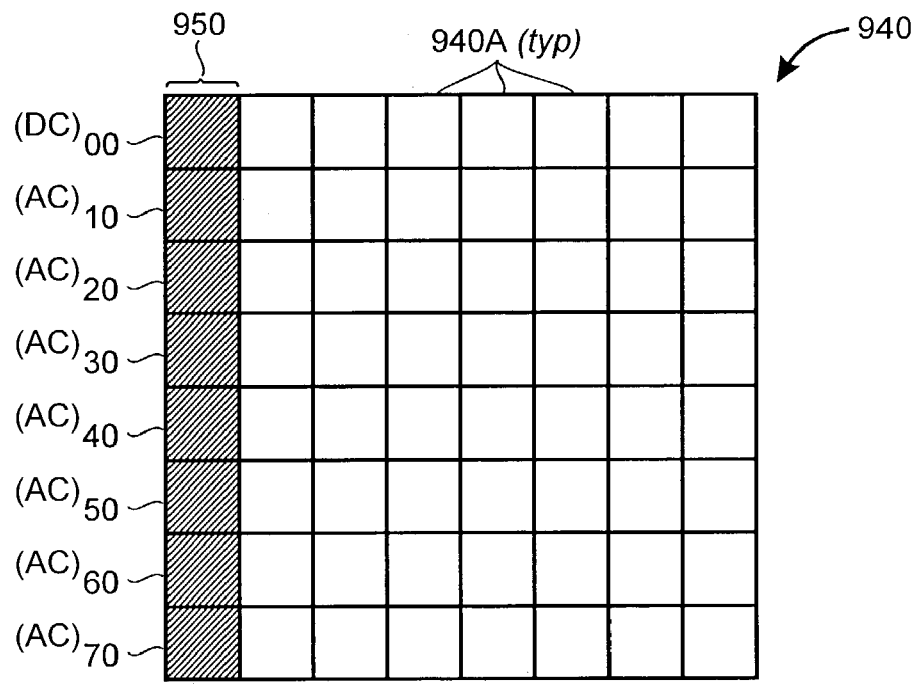

FIG. 9B is a diagram illustrating the organization and positions of "DC" horizontal frequency coefficients in an 8×8 DCT block, according to the invention.

Figure 10A:
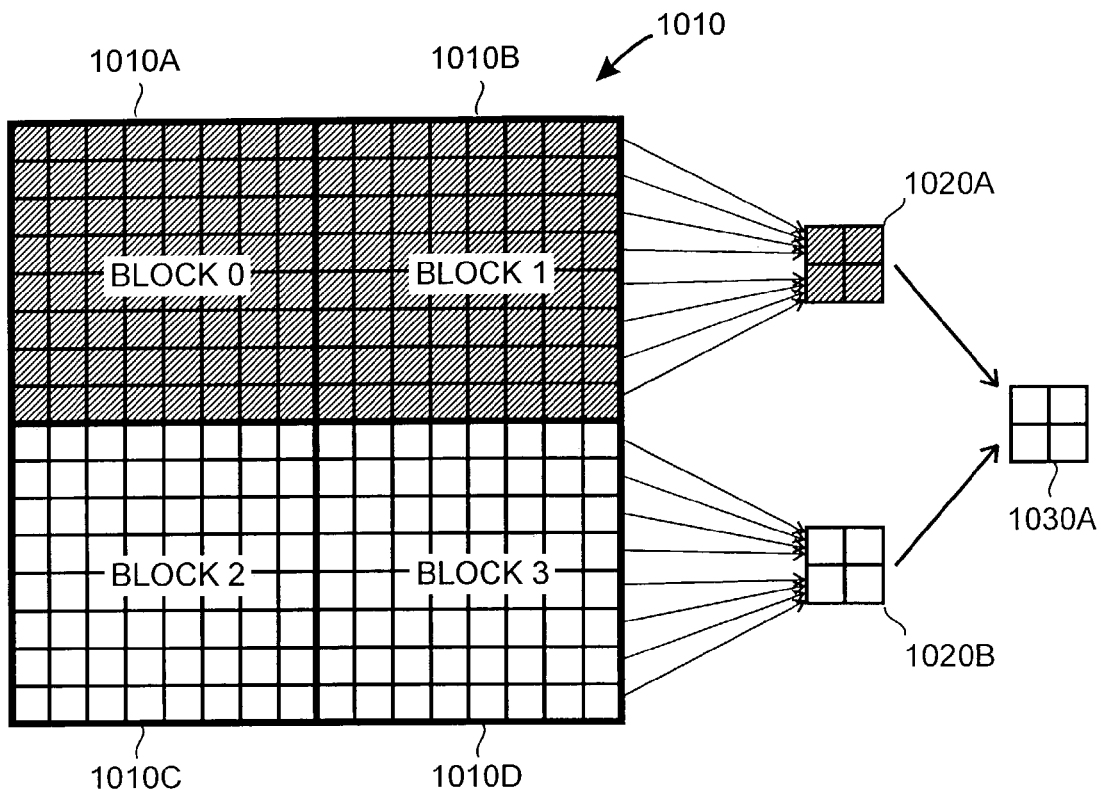

FIG. 10A is a diagram illustrating a technique for extracting reduced images from field DCT coded I-frames, according to the invention.

Figure 10B:
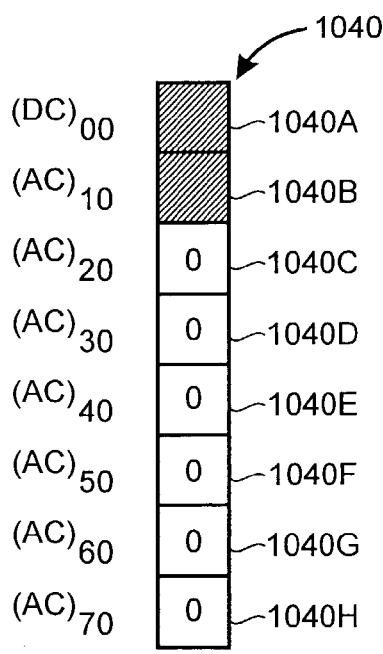

FIG. 10B is a diagram showing the organization of DCT coefficients in leftmost rows of 8×8 DCT blocks, according to the invention.

Figure 11A:
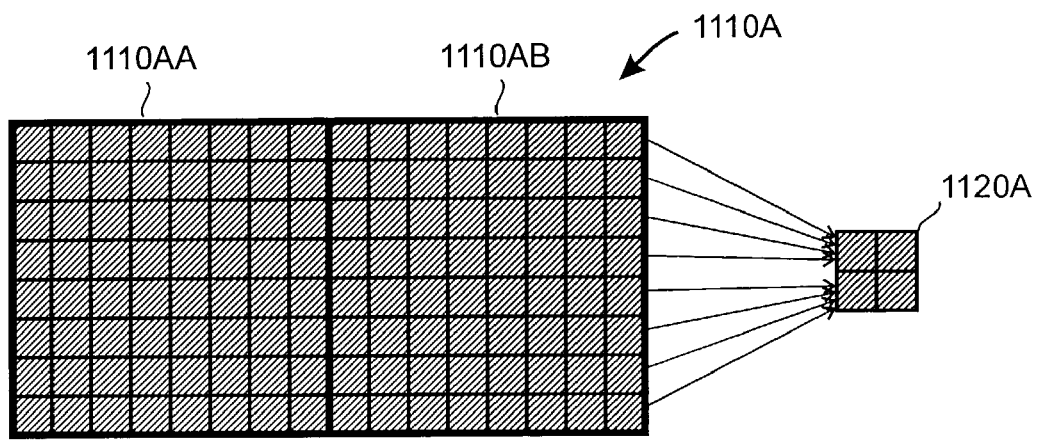

FIG. 11A is a diagram showing a top half of a field DCT coded macroblock, according to the invention.

Figure 11B:
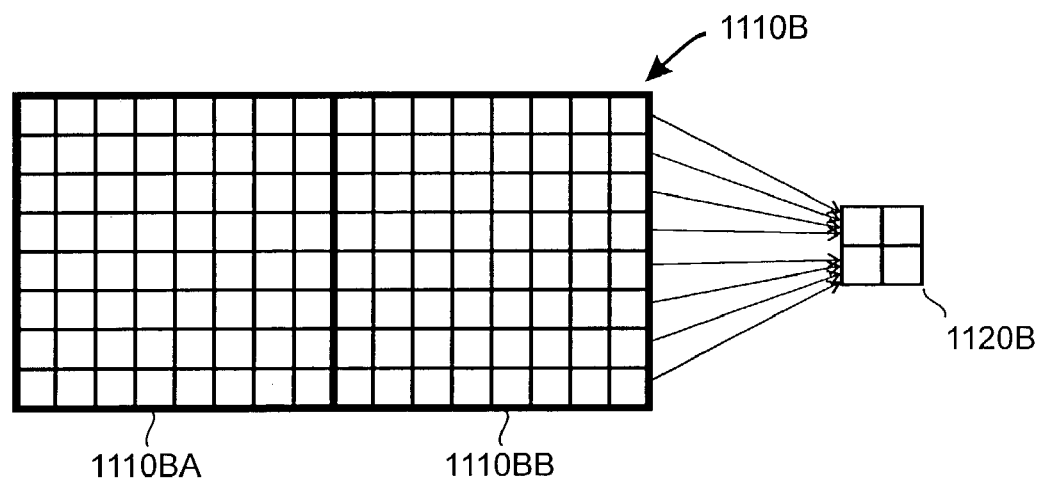

FIG. 11B is a diagram showing a bottom half of a field DCT coded macroblock, according to the invention.

Figure 12:
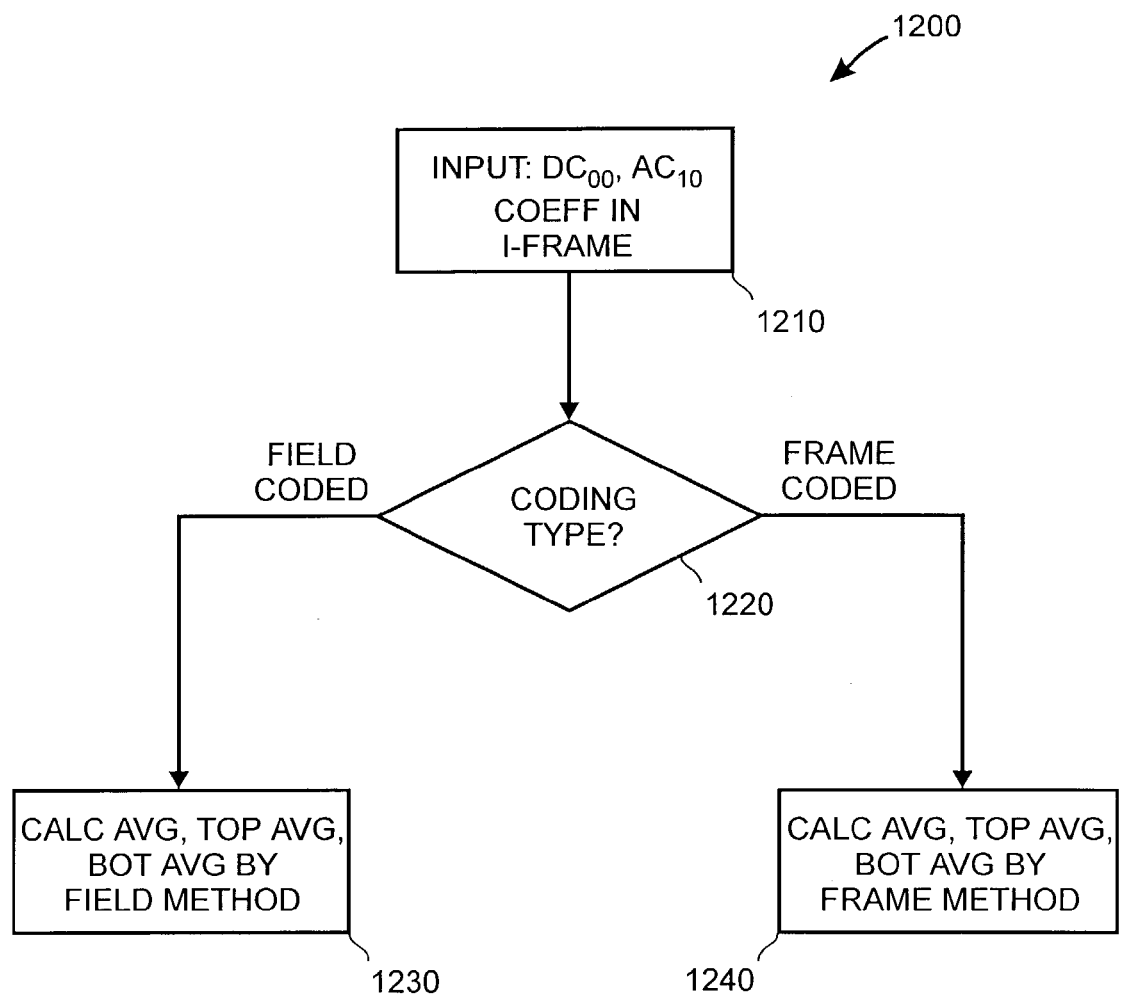

FIG. 12 is a flow chart showing the steps of extracting a DC image from an intra-coded frame, according to the invention.

Figure 13:
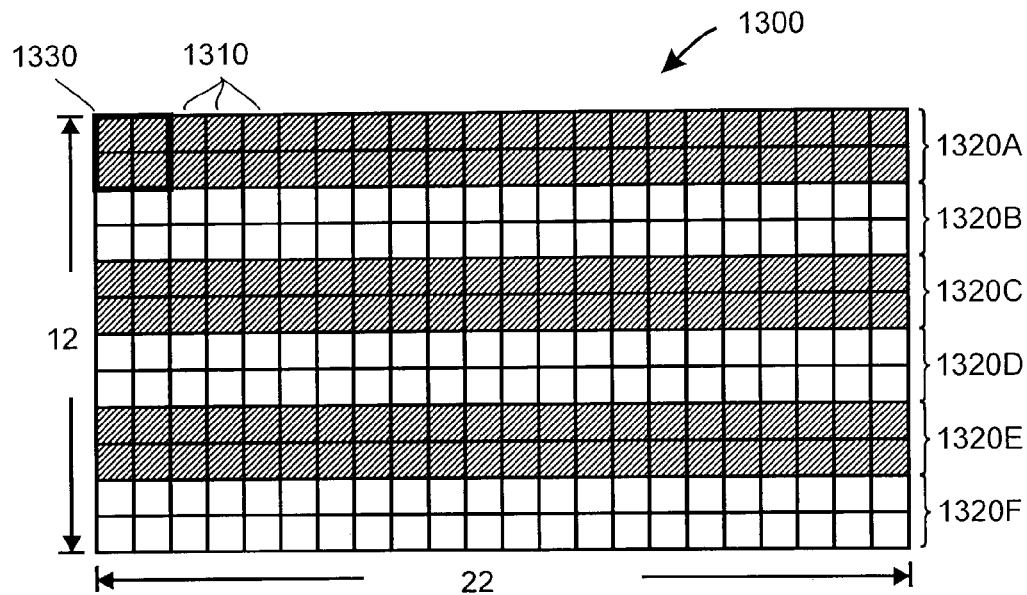

FIG. 13 is a diagram illustrating a technique for producing reduced-size images with a 16:1 linear reduction, according to the invention.

Figure 14:
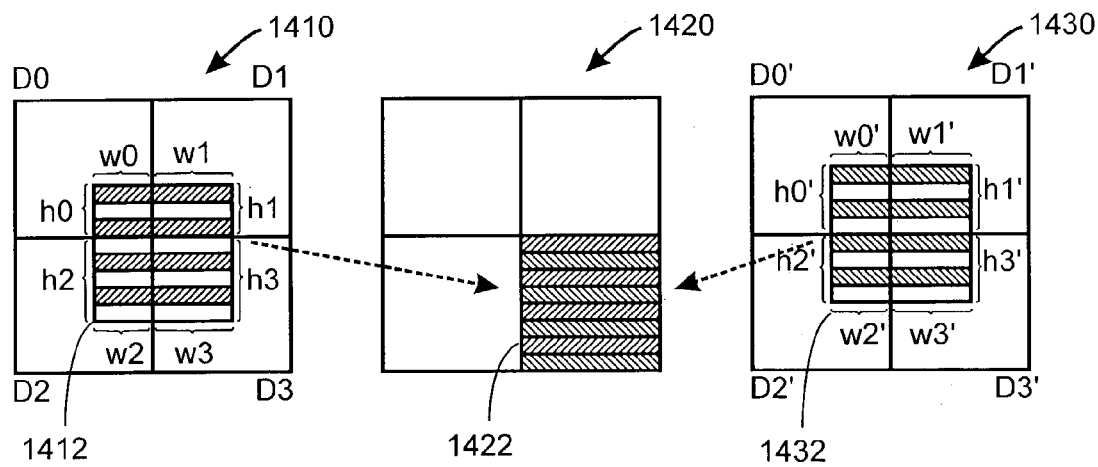

FIG. 14 is a diagram illustrating an aspect of producing reduced-size images for motion-compensated frames, according to the invention.

Figure 15:
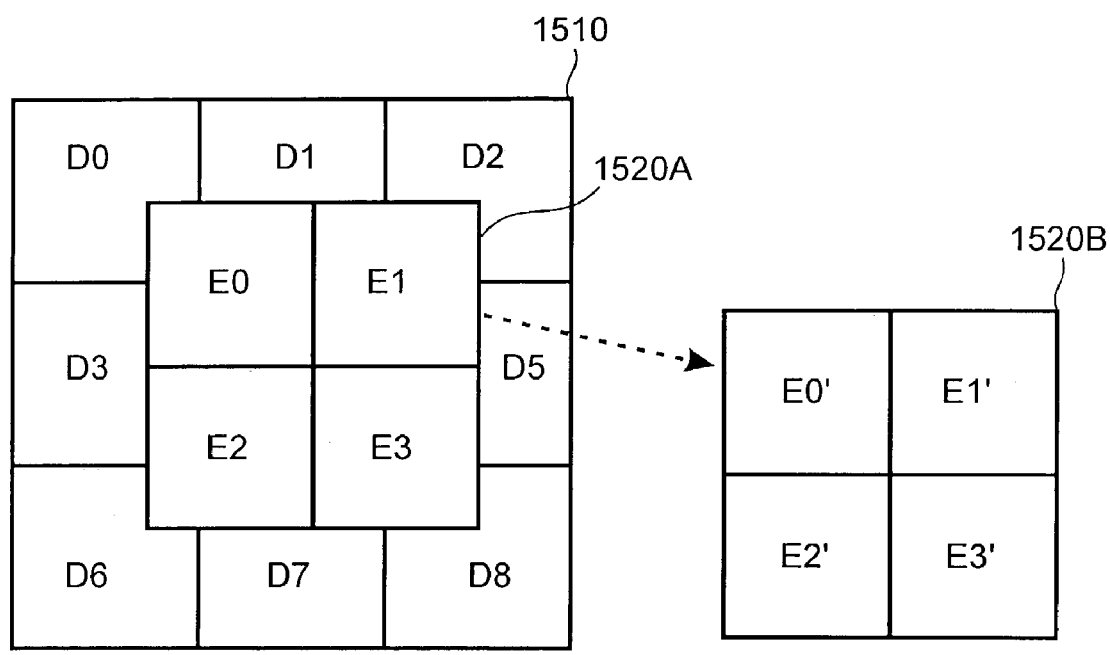

FIG. 15 is a diagram illustrating another aspect of motion compensation for reduced-size images, according to the invention.

Figure 16:
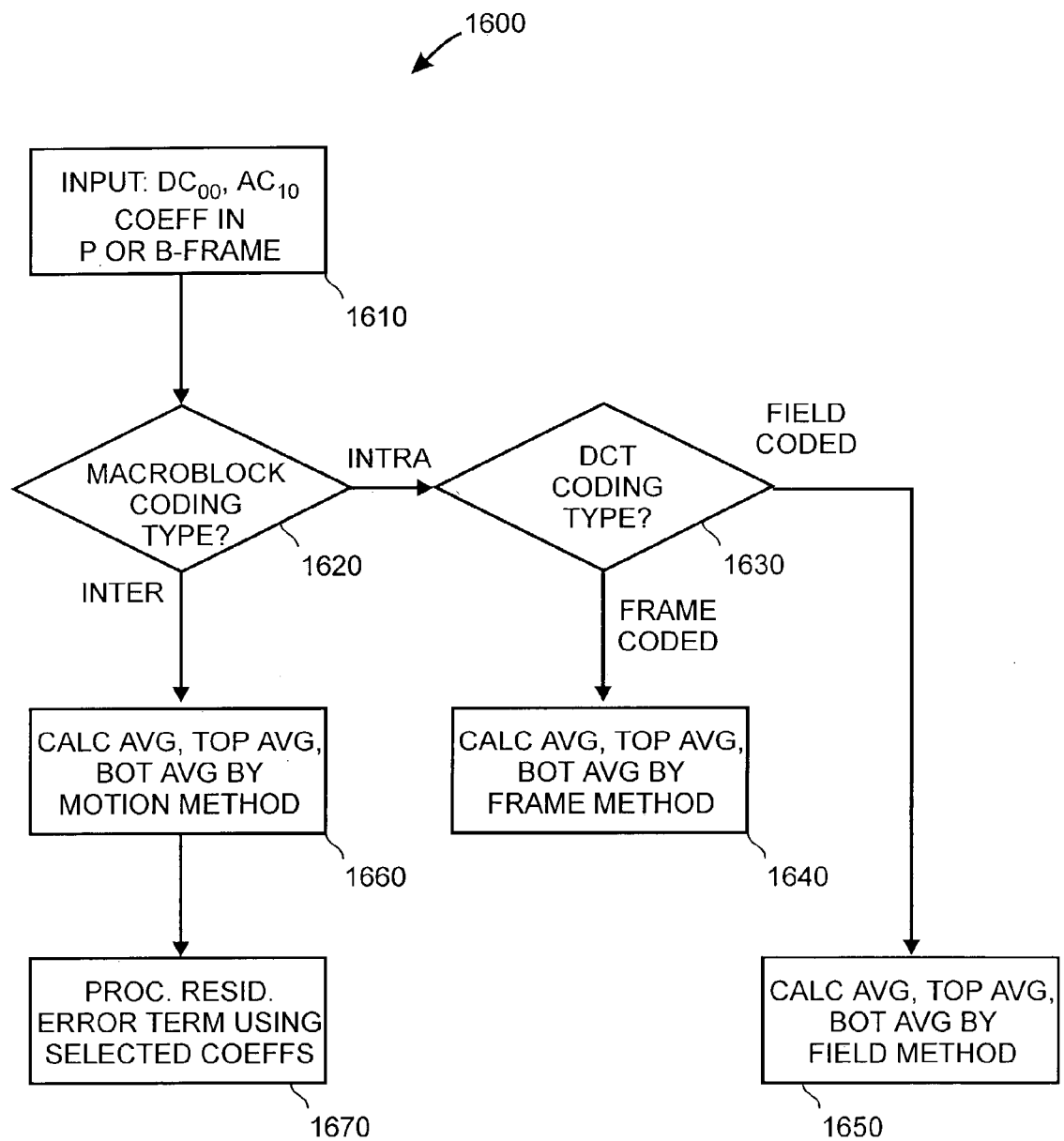

FIG. 16 is a flow chart showing steps of extracting DC images for P-frames and B-frames, according to the invention.

Figure 17A:
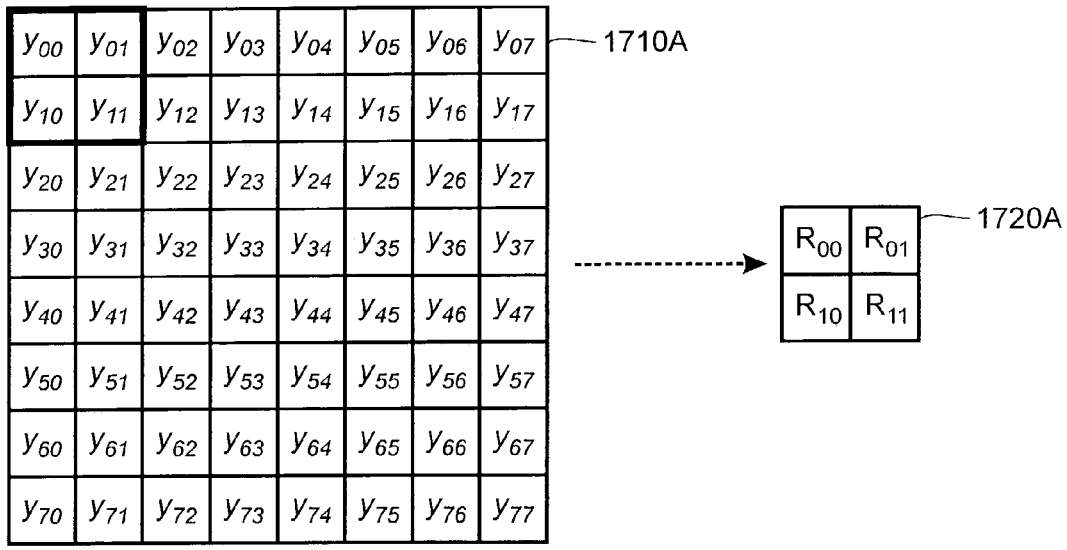

FIG. 17A is a diagram illustrating the production of one-sixteenth reduced-size images for frame DCT coded macroblocks, according to the invention.

Figure 17B:
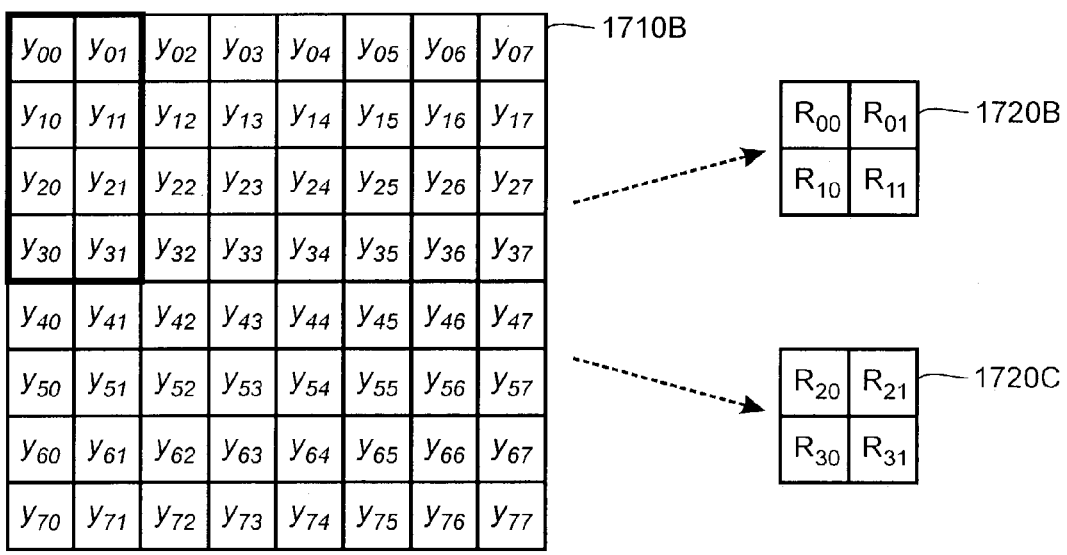

FIG. 17B is a diagram illustrating the production of one-sixteenth reduced-size images for field DCT coded macroblocks, according to the invention.

Figure 18:
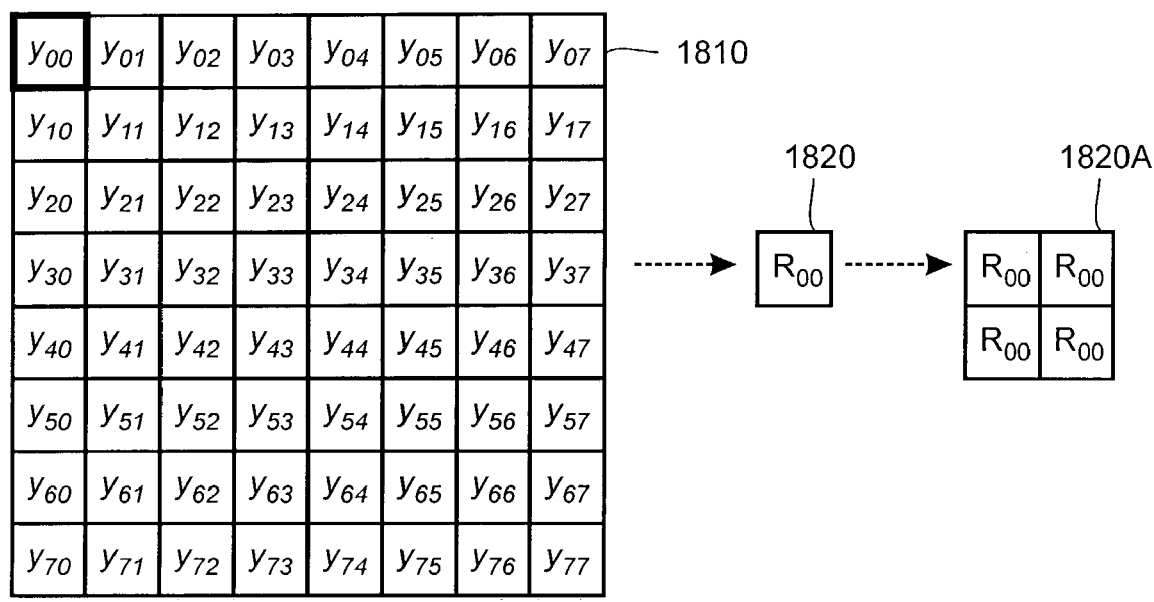

FIG. 18 is a diagram showing a technique for reducing chrominance resolution for reduced-size images, according to the invention.

Figure 19A:
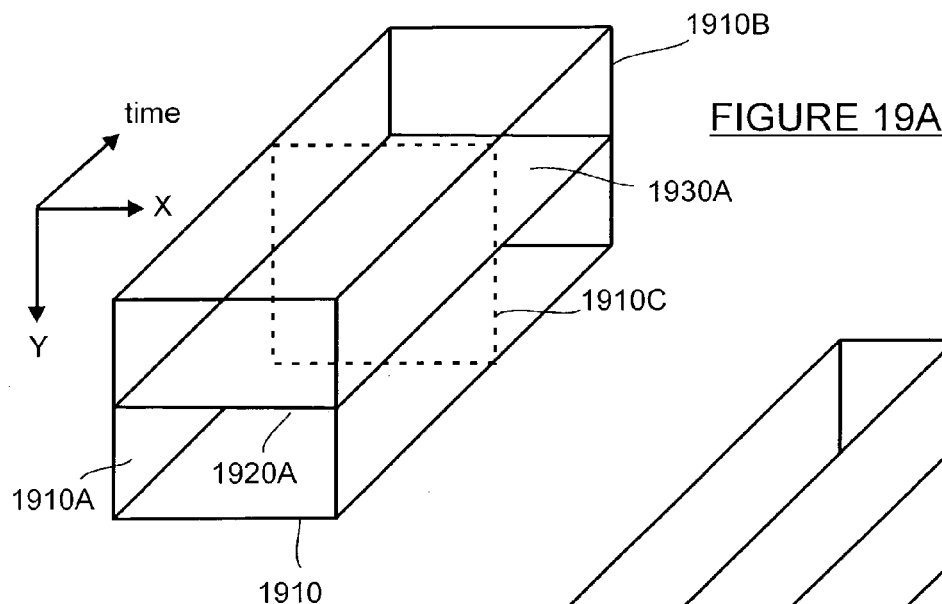
Figure 19B:
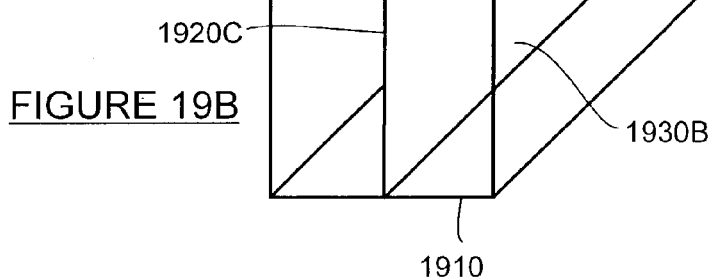
Figure 19C:
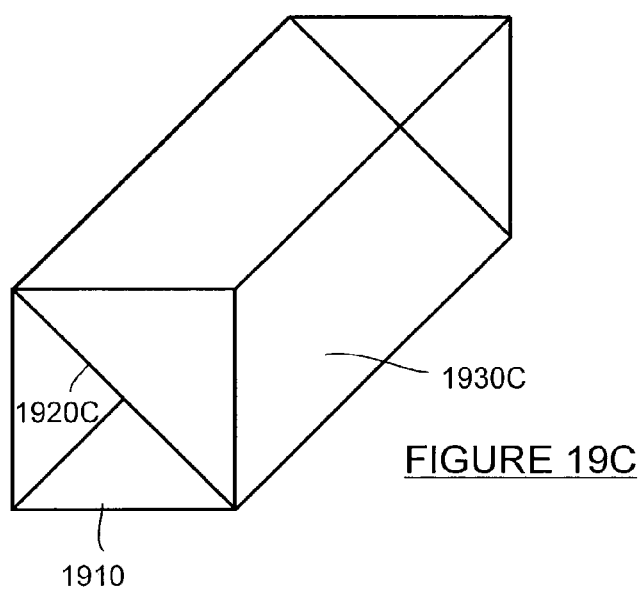

FIGS. 19A, 19B and 19C are diagrams illustrating three different visual image sampling strategies.

Figure 20A:
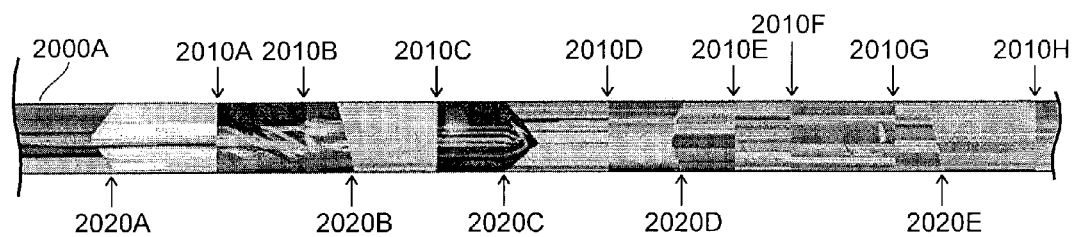
Figure 20B:
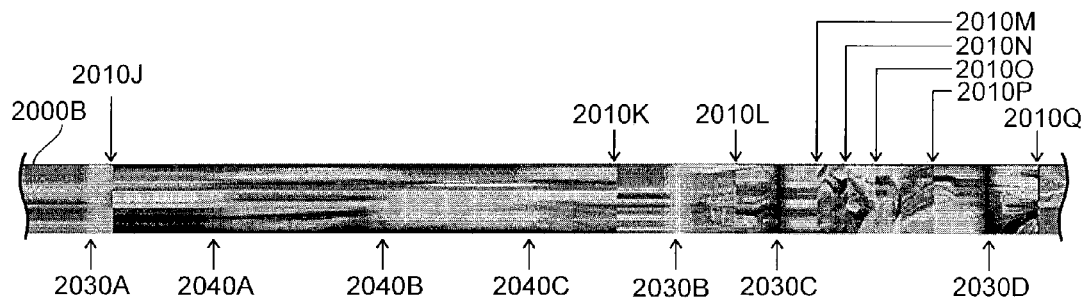
Figure 20C:
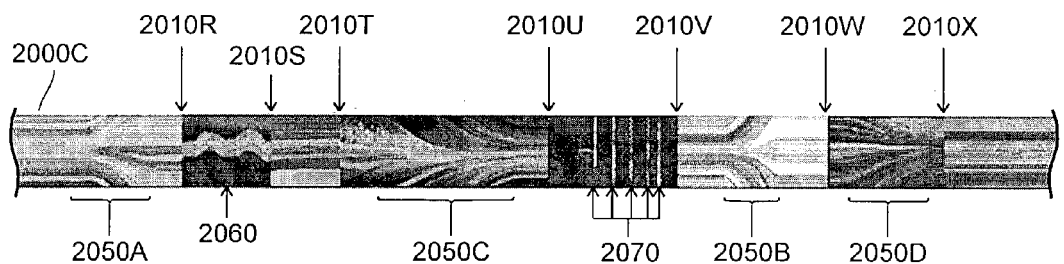

FIGS. 20A, 20B and 20C are graphic representations of three different visual rhythm segments, illustrating various visual aspects thereof.

Figure 20D:
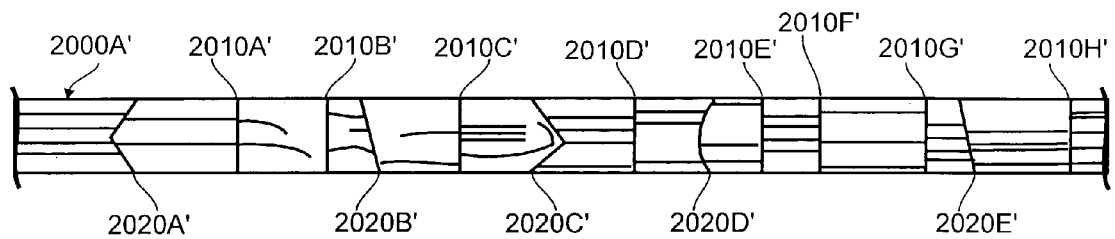
Figure 20E:
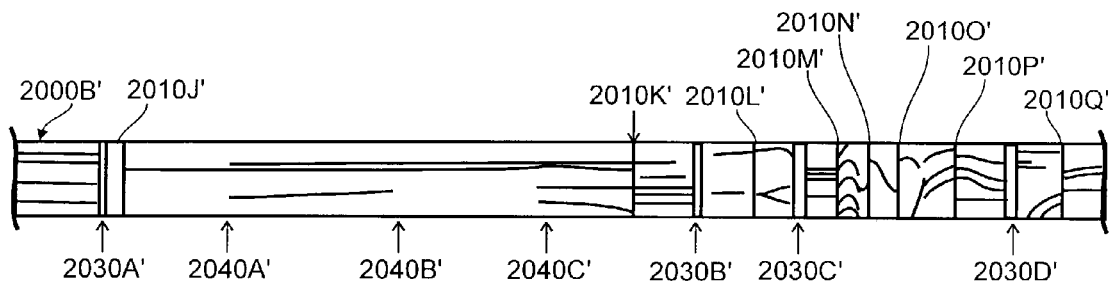
Figure 20F:
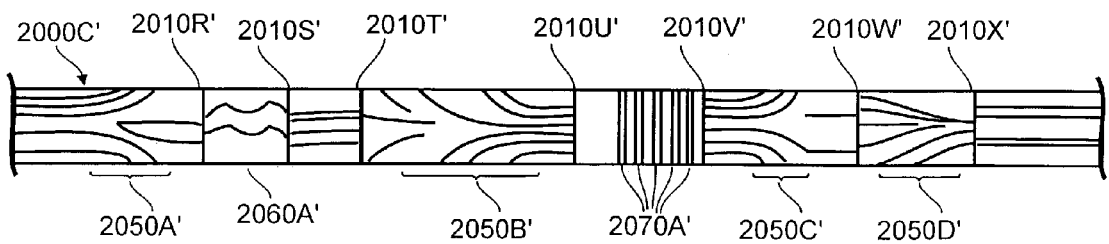

FIGS. 20D, 20E and 20F are graphic representations which are essentially different versions of FIGS. 20A, 20B and 20C.

Figure 21:
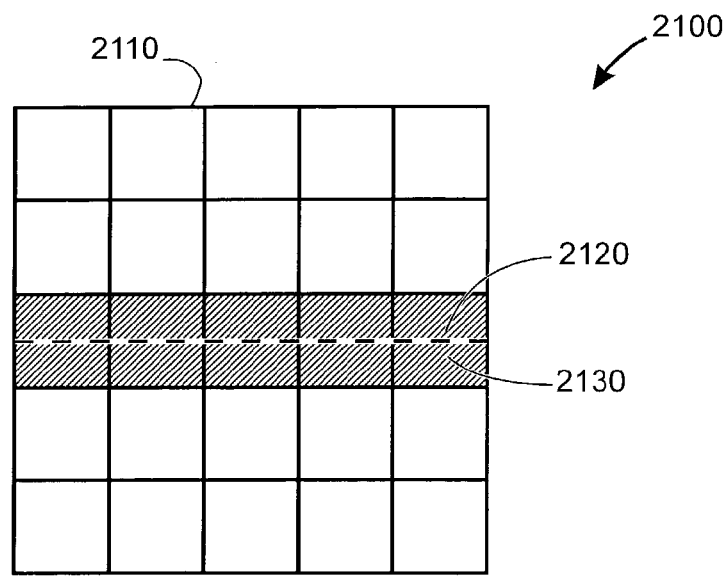

FIG. 21 is a diagram of a visual rhythm sampling path across a block-encoded frame image, according to the invention.

Figure 22:
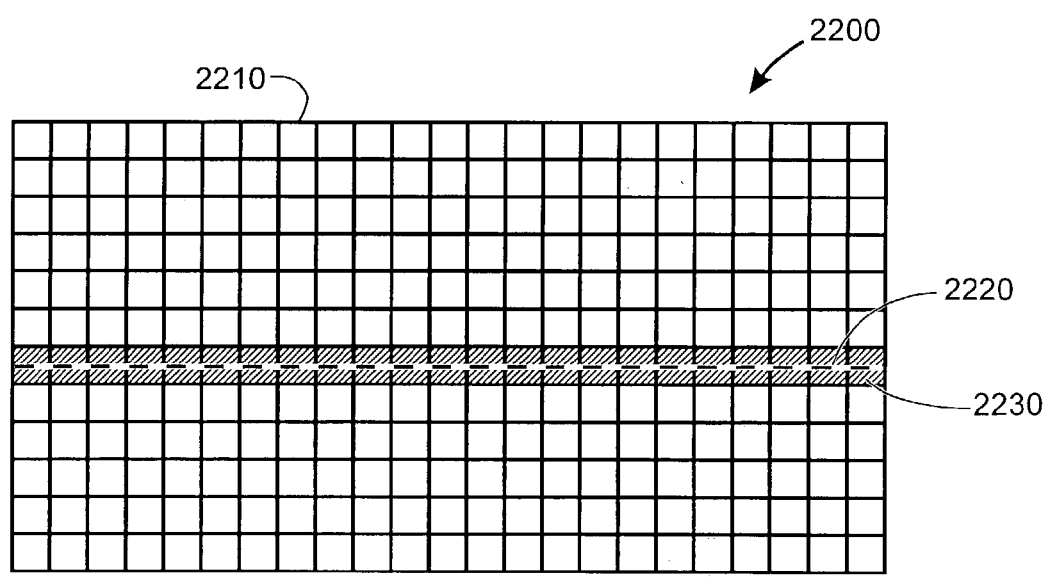

FIG. 22 is a diagram illustrating extraction of visual rhythm sample pixels from a DC image, according to the invention.

Figure 23:
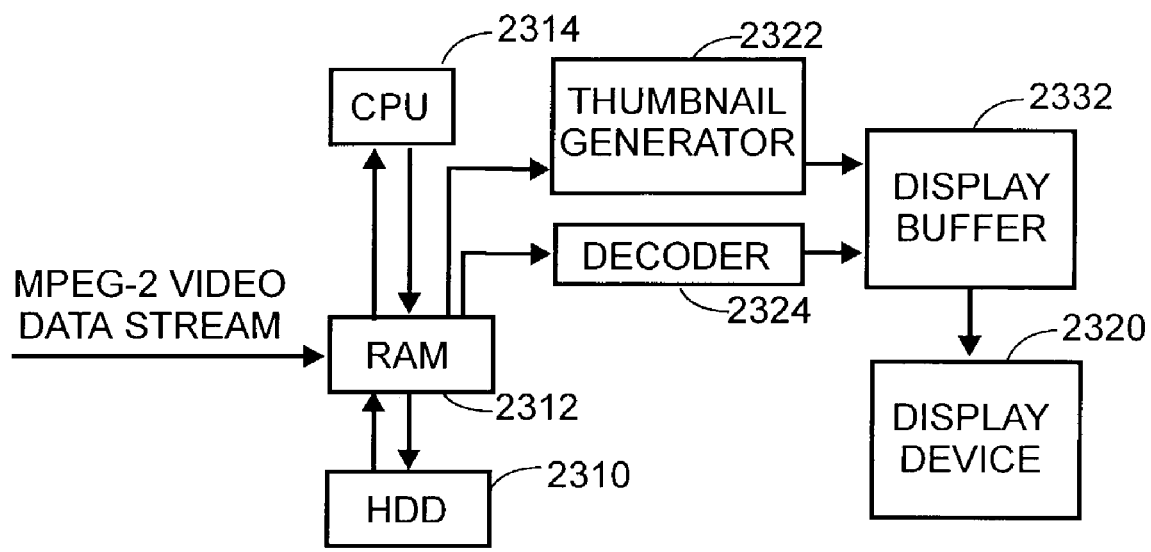

FIG. 23 is a block diagram of an embodiment of a system for producing reduced-size images, according to the invention.

DETAILED DESCRIPTION OF THE INVENTION

This invention relates to efficiently producing (generating) images whose size/resolutions are spatially-reduced in comparison with the size of fully decoded frames, from a compressed video stream. The invention can be applied to a variety of video compression techniques, including those supporting interlaced frames and motion compensation. Examples of formal standards defining such video compression techniques are MPEG-2, H.264 and MPEG-4. These image/video compression techniques employ a variety of "transformation" techniques, such as DCT (Discrete Cosine Transform), Hardamard transform, wavelet transform, and integer cosine transform, etc. For purposes of clarity and convenience, the invention is described herein as it applies to the MPEG-2 Video Standard. Those of ordinary skill in the art will understand its applicability to other standards, based on the descriptions set forth herein. Also, for purposes of brevity and clarity, the invention is generally described for single MPEG-2 "macroblocks", wherein a typical MPEG-2 field/frame comprises a plurality of macroblocks. Those of ordinary skill in the art will understand and appreciate the repetition of the inventive technique to process a plurality of macroblocks. It should also be understood that a macroblock can comprise any suitable number of blocks, such as (at least) two, four, eight or sixteen.

For purposes of this specification, a top half DC value is defined as a value proportional to the sum of top field pixel values in a block of pixels, and a bottom half DC is defined as a value proportional to the sum of bottom field pixel values in a block of pixels. The DC (average) value expressed hereinabove in equation (1) is divided into two average pixel values for top field pixel values and bottom field pixel values, respectively. Accordingly, equation (1) can be rewritten as:

$$DC \text{ value} = \frac{1}{8}\sum_{m=0}^{7}\sum_{n=0}^{7}s(m,n) \qquad (4)$$

$$= \frac{1}{2}\left[\underbrace{\frac{1}{4}\sum_{m=0}^{3}\sum_{n=0}^{7}s(2m,n)}_{\text{Top half } DC} + \underbrace{\frac{1}{4}\sum_{m=0}^{3}\sum_{n=0}^{7}s(2m+1,n)}_{\text{Bottom half } DC}\right].$$

The top half DC value and the bottom half DC values are proportional to the average pixel values for top and bottom field pixels, respectively. From equation (4), a DC value in an 8×8 block is equal to the average value of top half DC and bottom half DC. DC value extraction from MPEG-2 interlaced video is achieved by keeping the top half DC and bottom half DC values separate.

For video browsing, "DC images" (8:1 linear reduction factor reduced-size images constructed from DC "average" values) are more useful for HDTV than for SDTV due to the higher resolution of HDTV DC images (1920×1080 pixels), which yields a 240×136 "DC image" of suitable size for video browsing. The DC image size for SDTV (fall resolution of 704×480 pixels) is only 88×60 pixels, which is generally too small to be displayed in the TV for video browsing. For SDTV, 4:1 linear size reduction (16:1 by area) is more appropriate, yielding reduced-size images of 176×120 pixels.

FIG. 3 is a block diagram of a technique 300 for simultaneously producing a reduced-size 2M×2M image and separating interlaced fields from an intra-coded 2N×2N DCT macroblock 310 (where M<N). The macroblock 310 comprises four transform-coded N×N DCT-coded blocks. A coefficient selection process 320 eliminates (discards) higher-frequency coefficients from the macroblock 310 and retains the lower frequency coefficients. These coefficients are then passed on to an inverse DCT (IDCT) and field separation process 330. The number of low frequency coefficients retained depends upon whether the macroblock is field- or frame-coded. In the case that the macroblock 310 is field coded (where each frame image of a video sequence is encoded as a pair of interlaced field images) the inverse DCT and field separation process 330 separates upper and lower field data from the macroblock and converts the retained frequency coefficients into M×M upper and lower field images 340A and 340B.

FIG. 4 is a diagram of a technique for discarding high frequency coefficients when a macroblock is coded by frame DCT. A representative input macroblock 400A, includes four DCT-coded blocks 410, 420, 430 and 440, each comprising an N×N set of frequency coefficients. Selected higher frequency coefficients for each of the DCT-coded blocks are discarded while lower frequency coefficients are retained, as illustrated in an output macroblock 400B (representative of the input macroblock 400A with high frequency coefficients discarded), wherein the four DCT-coded blocks 410, 420, 430 and 440 of the input macroblock 400A have been reduced by including only lower frequency coefficient portions 410A, 420A, 430A and 440A thereof, while discarding higher frequency coefficient portions 410B, 420B, 430B and 440B (shaded) thereof. In the output macroblock 400B, the N×M (M<N) low frequency coefficients are retained and higher frequency coefficients are discarded.

When the output macroblock 400B is subsequently processed by a N×M IDCT and a field separation process (see 330, FIG. 3) four M×M pixel blocks are produced for each field (a total of 8 pixel blocks, four for the upper field and four for the lower) are constructed. This process is described in greater detail hereinbelow.

FIG. 5 illustrates a technique for discarding high frequency coefficients when a macroblock is coded by field DCT. A representative input macroblock 500A, includes four DCT-coded blocks 510, 520, 530 and 540, each comprising an N×N set of frequency coefficients. Selected higher frequency coefficients for each of the DCT-coded blocks are discarded while lower frequency coefficients are retained, as illustrated in an output macroblock 500B (representative of the input macroblock 500A with high frequency coefficients discarded), wherein the four DCT-coded blocks 510, 520, 530 and 540 of the input macroblock 500A have been reduced by including only lower frequency coefficient portions 510A, 520A, 530A and 540A thereof, while discarding higher frequency coefficient portions 510B, 520B, 530B and 540B (shaded) thereof. In the output macroblock 500B, the 2M×M (2M<N) low frequency coefficients are retained and higher frequency coefficients are discarded.

When the output macroblock 500B is subsequently processed by a 2M×M IDCT and a field separation process (see 330, FIG. 3) four M×M pixel blocks are produced for each field (a total of 8 pixel blocks, four for the upper field and four for the lower) are constructed. This process is described in greater detail hereinbelow.

The combined IDCT and field separation process (see 330, FIG. 3 and descriptions above with respect to FIGS. 4 and 5) performs an Inverse Discrete Cosine Transform (IDCT) and separates pixel values resulting from the IDCT into the top and bottom fields depending upon whether the macroblock is coded by frame DCT or by field DCT, as follows:

In MPEG-2, macroblocks are encoded via a two-dimensional Direct Cosine Transform (DCT). As is known to those of ordinary skill in the art, a two-dimensional (2D) DCT is essentially a concatenated set of horizontal and vertical one-dimensional (1D) DCT transforms. A DCT produces an array of coefficients equal in dimension to the array of pixels that it transforms. That is, an 8-point DCT (a DCT performed on 8 pixel values) produces 8 frequency coefficients. Similarly, a two-dimensional DCT produces an array of frequency coefficients equal in size to the array of pixel values that it transforms. That is, a two-dimensional DCT performed on an 8×8 array of pixels (8×8 pixel block) produces an 8×8 DCT block. Conversely, the Inverse DCT (IDCT) process (1D or 2D) produces a pixel array equal in dimension to the DCT block upon which it operates. That is, an IDCT (Inverse DCT) performed on an 8×8 DCT block produces an 8×8 pixel array (pixel block).

The forward and inverse DCT transforms are very similar to one another. The one-dimensional N-point forward DCT is defined as:

$$F(n) = \frac{a(n)}{\sqrt{N}} \sum_{x=0}^{N-1} f(x) \cos \frac{(2x+1)n\pi}{2N}$$

where:

F(n) is the "$n^{th}$" frequency coefficient;

f(x) is the value of the pixel at position "x"; and $$a(n) = \begin{cases} 1, & \text{when } n = 0 \\ \sqrt{2}, & \text{otherwise} \end{cases}$$

Conversely, the one-dimensional N-point inverse DCT is defined as:

$$f(x) = \frac{1}{\sqrt{N}} \sum_{n=0}^{N-1} a(n) F(n) \cos \frac{(2x+1)n\pi}{2N}$$

where:

F(n) is the "$n^{th}$" frequency coefficient;

f(x) is the value of the pixel at position "x"; and $$a(n) = \begin{cases} 1, & \text{when } n = 0 \\ \sqrt{2}, & \text{otherwise} \end{cases}$$

In practice, a two dimensional (2D) DCT is accomplished on a two-dimensional pixel array by performing "horizontal" one-dimensional DCT operations on each of the horizontal rows of the pixel array, storing the resultant 1D "horizontal" DCT coefficients into a like-sized intermediate array in place of the rows of pixel values from which they are derived, then performing "vertical" one-dimensional DCT operations on each of the vertical columns of the intermediate array, and storing the 1D "vertical" DCT coefficients into a like-sized DCT block in place of the columns of intermediate array coefficients from which they are derived.

A two dimensional inverse DCT is accomplished similarly by operating on the DCT block to produce pixel values, but substituting 1D inverse DCT operations for the 1D forward DCT operations. A 2D N×N IDCT can be expressed as follows:

$$f(x, y) = \frac{1}{N} \sum_{u=0}^{N-1} \sum_{v=0}^{N-1} a(u)a(v) F(u, v) \cos\left[\frac{(2x+1)u\pi}{2N}\right] \cos\left[\frac{(2y+1)v\pi}{2N}\right]$$

where:

$$a(u) = \begin{cases} 1, & \text{when } u = 0 \\ \sqrt{2}, & \text{otherwise} \end{cases}$$

$$a(v) = \begin{cases} 1, & \text{when } v = 0 \\ \sqrt{2}, & \text{otherwise} \end{cases}$$

To perform a two dimensional inverse DCT on a DCT block that has had coefficients eliminated (as described hereinabove), it is necessary to make a compensating adjustment in the IDCT transform to account for the difference in transform length. This is accomplished by using the following 1D IDCT transform in processing shortened rows or columns:

$$f(x) = \frac{1}{\sqrt{N}} \sum_{n=0}^{M-1} a(n) X(n) \cos \frac{(2x+1)n\pi}{2M}$$

where:
N=original transform length (dimension),
M=shortened transform length, and $$a(n) = \begin{cases} 1, & \text{when } n = 0 \\ \sqrt{2}, & \text{otherwise} \end{cases}$$

When $M=M_H$ in the horizontal direction and $M=M_V$ in the vertical direction, this results in a 2D IDCT that can be expressed as follows:

$$f(x, y) = \frac{1}{N} \sum_{u=0}^{M_H-1} \sum_{v=0}^{M_V-1} a(u)a(v) F(u, v) \cos\left[\frac{(2x+1)u\pi}{2M_H}\right] \cos\left[\frac{(2y+1)v\pi}{2M_V}\right]$$

Since 2D IDCTs always produce a pixel block identical in size to the DCT block upon which they operate, an 8×8 IDCT produces an 8×8 pixel block, an 8×2 IDCT produces an 8×2 pixel block, a 2×2 IDCT produces a 2×2 pixel block, etc.

In MPEG-2 encoding, macroblocks typically represent 16×16 arrays of pixels, organized as four DCT-encoded 8×8 pixel blocks. Accordingly, each macroblock includes four 8×8 DCT blocks.

Two exemplary cases are now described: (i) IDCT and Field Separation for Frame DCT Coded Macroblocks and (ii) IDCT and Field Separation for Field DCT Coded Macroblocks (i) IDCT and Field Separation for Frame DCT Coded Macroblocks An exemplary case of a 16 by 16 (four 8×8 pixel blocks) frame DCT coded macroblock is now described. Because each DCT block (and the corresponding block of pixels from which it was derived) is an 8×8 array, "N" is equal to 8. Assuming a 4 to 1 desired image size reduction, "M" is equal to 2. (That is, each "N×N" or 8×8 original image block gets reduced to an "M×M" or 2×2 reduced-size image block). Discarding high frequency coefficients in the manner shown and described hereinabove with respect to FIG. 4 reduces the four 8×8 (N×N) coefficient DCT blocks to four 8×2 (N×M) coefficient DCT blocks. A 2D IDCT is performed on the four 8×2 DCT blocks to produce four 8×2 pixel blocks.

FIG. 6A is a diagram showing the processing of the four 8×2 (N×M) pixel blocks. A pixel array 610A comprising the four 8×2 pixel blocks 610A1, 610A2, 610A3 and 610A4 is subjected to a field separation process (as described above) to produce a reduced-size upper field image 620A and a reduced-size lower-field image 630A.

A first row of the upper (top) field image 620A is produced by "combining" first and third rows of the pixel array 610A. A second row of the upper (top) field image 620A is produced by combining fifth and seventh rows of the pixel array 610A. A third row of the upper (top) field image 620A is produced by combining ninth and eleventh rows of the pixel array 610A. A fourth row of the upper (top) field image 620A is produced by combining thirteenth and fifteenth rows of the pixel array 610A. This results in a 4×4 pixel reduced top field image, essentially composed of four 2×2 reduced pixel blocks, one reduced 2×2 reduced pixel block for each 8×8 DCT block.

A first row of the lower (bottom) field image 630A is produced by combining second and fourth rows of the pixel array 610A. A second row of the lower (bottom) field image 630A is produced by combining sixth and eighth rows of the pixel array 610A. A third row of the lower (bottom) field image 630A is produced by combining tenth and twelfth rows of the pixel array 610A. A fourth row of the lower (bottom) field image 630A is produced by combining fourteenth and sixteenth rows of the pixel array 610A. This results in a 4×4 pixel reduced bottom field image, essentially composed of four 2×2 reduced pixel blocks, one reduced 2×2 reduced pixel block for each 8×8 DCT block.

The aforementioned combining operation can be accomplished by any suitable means, such as by averaging pixel values.

(ii) IDCT and Field Separation for Field DCT Coded Macroblocks

IDCT and field separation for field DCT coded macroblocks is similar to the processing described hereinabove for frame DCT coded macroblocks, except that the reduced DCT blocks are 2M×M in dimension (as described hereinabove with respect to FIG. 5) and the relationship between the rows of the pixel blocks and the image fields (top and bottom field images) is different.

Using an exemplary case where a 4 to 1 reduced-size image (1/16 size by area) is desired, N=8 and M=2. Discarding high frequency coefficients in the manner shown and described hereinabove with respect to FIG. 5 reduces four 8×8 (N×N) coefficient DCT blocks to four 4×2 (2M×M) coefficient DCT blocks. A 2D IDCT is performed on the four 4×2 DCT blocks to produce four 4×2 pixel blocks.

FIG. 6B is a diagram showing the processing of the four 4×2 (2M×M) pixel blocks. A pixel array 610B comprising the four 4×2 pixel blocks 610B1, 610B2, 610B3 and 610B4 is subjected to a field separation process (as described above) to produce a reduced-size upper field image 620B and a reduced-size lower-field image 630B. Due to the smaller number of rows in the pixel array 610B compared to the pixel array 610A of FIG. 6A, no "combining" operation is required to produce the upper and lower (top and bottom) field images 620B and 630B.

A first row of the upper (top) field image 620B is taken from a first row of the pixel array 610B. A second row of the upper (top) field image 620B is taken from a second row of the pixel array 610B. A third row of the upper (top) field image 620B is taken from a third row of the pixel array 610B. A fourth row of the upper (top) field image 620B is taken from a fourth row of the pixel array 610B. This results in a 4×4 pixel reduced top field image 620B, essentially composed of four 2×2 reduced pixel blocks, one reduced 2×2 reduced pixel block for each 8×8 DCT block of the original, full-size macroblock.

A first row of the lower (bottom) field image 630B is taken from a fifth row of the pixel array 610B. A second row of the lower (bottom) field image 630B is taken from a sixth row of the pixel array 610B. A third row of the lower (bottom) field image 630B is taken from a seventh row of the pixel array 610B. A fourth row of the lower (bottom) field image 630B is taken from a eighth row of the pixel array 610B. This results in a 4×4 pixel reduced top field image 630B, essentially composed of four 2×2 reduced pixel blocks, one reduced 2×2 reduced pixel block for each 8×8 DCT block of the original, full-size macroblock.

The discussion above with respect to FIGS. 6A and 6B is directed primarily to luminance (brightness/grayscale) information and does not consider chrominance (color) information. Commonly used color video encoding formats are the 4:4:4, 4:2:2, and 4:2:0 formats. Those of ordinary skill in the art will understand that the 4:4:4 encoding format encodes chrominance data in much the same way as luminance information, permitting reduced-size chrominance image data to be produced in the same way as described hereinabove for luminance information. On the other hand, the encoding of chrominance information in the 4:2:2 and 4:2:0 formats is less "dense" than chrominance information in the 4:4:4 format and is encoded with fewer DCT coefficients. In the 4:2:2 encoding format, a 2×2 macroblock (i.e., a macroblock having four 8×8 DCT blocks in a 2 block high by 2 block wide configuration) encodes chrominance information into two vertically neighboring DCT blocks of chrominance data. Accordingly, motion vector information is horizontally halved when applying it to 4:2:2 chrominance information. In the 4:2:0 chrominance format, a 2×2 macroblock encodes chrominance information into only one DCT block. Accordingly, motion vector information is halved both horizontally and vertically when applying it to 4:2:0 chrominance information.

Since chrominance information is encoded less densely than luminance information, less computation (and consequently less time) is required to decode it. However, further speed improvements may be realized by reducing chrominance components by a factor of two with respect to luminance. Because the human eye is less sensitive to chrominance (color) information than to luminance (brightness/grayscale) information, a 2 to 1 reduction in chrominance resolution relative to luminance resolution produces images which the human eye perceives as being either un-degraded or only slightly degraded.

FIG. 7 is a block diagram of a process 700 for producing chrominance information for reduced-size images. Starting with an original DCT block of N×N DCT coefficients 710, chrominance information for a reduced-size image of M×M pixels is desired. A chrominance size factor L chosen such that 2L=M. In a first step, the L×L low frequency components 720A are selected and retained, while the remaining high frequency components 720B are discarded. An L×L IDCT 730 is performed on the L×L selected coefficients 720A to produce an L×L array 740 of chrominance information. (For 4:2:0 chrominance format, one L×L (2L=M) IDCT is performed when four M×M IDCTs are performed for luminance in a macroblock to obtain reduced-sized images.) Next, an interpolation step 750 is performed on the L×L array 740 to enlarge the chrominance information two times (e.g., by pixel replication), producing a 2L×2L array 760 (2L×2L=M×M) that matches the size of corresponding M×M luminance information.

For the case where N=8 and M=2, a chrominance size factor of L=1 is determined. Depending on the DCT coding type, either four 2×2 DCT blocks or two 4×2 DCT blocks are retained for luminance. For chrominance components, a 1×1 DCT block is retained and other coefficients in block are discarded. By taking a 1×1 IDCT, one pixel of chrominance information is obtained. This chrominance information is then replicated to make a 2×2 pixel block as shown in FIG. 18 (discussed hereinbelow).

FIG. 8 is a block diagram of an embodiment of apparatus ("thumbnail generator") 800 for producing reduced-size images, according to the invention. A coefficient selection block 810 processes macroblocks of an MPEG-2, determining which DCT coefficients to retain and which DCT coefficients to discard, depending upon the degree of size-reduction desired. This is accomplished as described hereinabove with respect to FIGS. 4 and 5. Next, a partial VLC (variable-length code) decode block 815 decodes only those coefficients that were selected for retention by the coefficient selection block 810. (DCT coefficients are variable-length coded in MPEG-2.) A partial dequantizer block 820 "dequantizes" the selected coefficients. (Those of ordinary skill in the art will understand that DCT coefficients in MPEG-2 encoding are quantized according to a quantization table and must be dequantized before they can be used.) Next, a reduced-size image extraction block 825 "decodes" the dequantized DCT coefficients to produce reduced-size images. This is accomplished by the IDCT and field separation technique described hereinabove with respect to FIGS. 4, 5, 6A and 6B.

A summing block 830 adds motion compensation information (only applicable to inter-coded frames such as P and B frames, as described in greater detail hereinbelow) to the reduced-size images produced by the reduced image extraction block 825. Motion compensation is implemented by a first frame buffer 835, a second frame buffer 840, an averaging function block 845 and a multiplexer 850. The first frame buffer 835 stores a recent (current) image. The second frame buffer 840 stores a previous image. The averaging block 845 combines information from the first and second frame buffers 825 and 840. The multiplexer 850 selects an output from the first frame buffer 835, the second frame buffer 840 for the averaging block 845 for feedback to the summing block 830. Motion compensation for reduced-size images is described in greater detail hereinbelow.

The summing block 830 produces an output image which gets stored in an image buffer 855. A post-processing block 860 applies a filtering algorithm on the reduced-size image stored in the image buffer 855 to reduce the effect of artifacts caused by reducing the image resolution. One suitable filtering algorithm is a 3×3 convolution filter with a window matrix W as follows:

$$W = \frac{1}{36} \cdot \begin{bmatrix} 1 & 4 & 1 \\ 4 & 16 & 4 \\ 1 & 4 & 1 \end{bmatrix}$$

However, any suitable type of filter can be used as post-processing filter.

For HDTV and SDTV applications, two specific size reduction ratios are of particular interest. For HDTV applications, where full-screen video resolution is 1920×1080 pixels, an 8:1 linear size reduction (64:1 reduction by area) is useful for producing thumbnail images for browsing. Full screen images reduced by this ratio are 240×170 pixels. For SDTV applications, where full-screen video resolution is only 720×480 pixels, a 4:1 linear size reduction (16:1 size reduction by area) is more useful.

The 8:1 linear reduction reduces each 8×8 image block to a single pixel (N=8, M=1). That is, each pixel in the reduced-size image corresponds to 64 pixels in the full size image. For this type of reduced image, all that is need for each 8×8 image block is an average or "DC" value for the block. This DC value is then used as a pixel value in the reduced-size image. This type of image is known as a "DC" image, deriving its name from reliance only on average values, which can be derived exclusively from the zero frequency coefficients (DC coefficients) in each macroblock.

There are now described a number of techniques for DC image extraction,
from an I-frame coded as frame DCT
from an I-frame coded as field DCT
from P- and B-frames I. DC Image Extraction from I-Frame Coded as Frame DCT The extraction of DC images from an I-frame coded as frame DCT is a straightforward process, requiring only the (0,0) frequency coefficient (the frequency component for zero frequency in both vertical and horizontal directions). However, to perform motion compensation effectively for P and B frames, it is also necessary to determine top half and bottom half average values. Because the DCT is an orthogonal transform, the two-dimensional (2-D) DCT can be represented as concatenated horizontal and vertical 1-D DCTs. The 8-point 1-D DCT is expressed as $$X(k) = \frac{a(k)}{\sqrt{8}} \sum_{n=0}^{7} x(n) \cos \frac{(2n+1)k\pi}{16}, \quad (5)$$

where $$a(k) = \begin{cases} 1, & k = 0 \\ \sqrt{2}, & \text{otherwise} \end{cases}.$$

From equation (5), X(0) which is the first coefficient for 1-D DCT can be represented as $$\frac{1}{\sqrt{8}} \sum_{n=0}^{7} x(n).$$

That is, X(0) is proportional to the average value for horizontal pixel values.

FIG. 9A illustrates the relationship between an 8 element input pixel array 910 and a first element (term) X(0) of an 8 element output frequency coefficient array 930. The input pixel array 910 comprises 8 horizontally contiguous pixel values 910A, 910B, 910C, 910D, 910E, 910F, 910G and 910H. The output frequency coefficient array 930 comprises eight frequency coefficients 930A, 930B, 930C, 930D, 930E, 930F, 930G and 930H. As shown in FIG. 9A, these frequency coefficients are arranged in order of increasing frequency from left to right, with the leftmost coefficient 930A (X(0)) being the "DC" or zero-frequency coefficient. Referring again to equation (5) above, the computation of the first frequency coefficient 930A (X(0)) is accomplished by adding the values of all of the input pixels (930A,B,C . . . ), multiplying the result by $$\frac{1}{\sqrt{8}}$$

and storing the result as the first coefficient 930A. The adding and multiplication is accomplished by means of a summing and scaling block 920, which adds all of the pixel values together and scales the result by $$\frac{1}{\sqrt{8}}.$$

The summing and scaling block 920, in effect, performs the function of equation (5) for k=0, thereby producing X(0) as a result.

In producing reduced-size images at a 4 to 1 reduction ratio, a 16×16 macroblock is reduced to a 4×4 image. Since the 16×16 macroblock is made up of four 8×8 DCT blocks representing four 8×8 pixel image blocks, it is useful to obtain the average value (zero frequency component or "DC" value) separately for upper and lower halves (4×8 pixels each) of each 8×8 image block. These average values are referred to hereinbelow as "top half DC" and "bottom half DC" values for the upper and lower halves, respectively, of the image blocks.

For each DCT block, the eight DCT coefficients in the first column represents the zero frequency coefficients (or average values) for the eight rows of the DCT block. Denoting these 8 DCT coefficients as $(DC)_{00}$, $(AC)_{10}$, $(AC)_{20}$, . . . , $(AC)_{70}$ by Y(0), Y(1), Y(2), . . . , Y(7), respectively and the pixel value at m-th row and n-th column as s(m,n), the 1-D IDCT in the vertical direction after multiplying $\sqrt{8}$ to each of the first coefficients in horizontal direction can be written as $$y(m) = \frac{1}{\sqrt{8}} \sum_{k=0}^{7} a(k)\sqrt{8}\, Y(k) \cos\frac{(2m+1)k\pi}{16} \qquad (6)$$

$$= \sum_{k=0}^{7} a(k) Y(k) \cos\frac{(2m+1)k\pi}{16},$$

where $$a(k) = \begin{cases} 1, & k = 0 \\ \sqrt{2}, & \text{otherwise} \end{cases}.$$

Therefore, $y(m) = \sum_{n=0}^{7} s(m,n)$ $(m = 0, \ldots, 7)$.

FIG. 9B illustrates this organization of the DCT coefficients in a DCT block 940. The DCT block 940 is an 8×8 array of DCT coefficient values 940A. A first column 950 (shaded) of the DCT block 940 comprises the 8 DCT coefficients (940A) designated $(DC)_{00}$, $(AC)_{10}$, $(AC)_{20}$, $(AC)_{30}$, $(AC)_{40}$, $(AC)_{50}$, $(AC)_{60}$, and $(AC)_{70}$. The calculation of each half DC value (top half DC or bottom half DC value) requires all 8 DCT coefficients $(DC)_{00}$, $(AC)_{10}$, $(AC)_{20}$, . . . , $(AC)_{70}$ in the first column 950. Applying equation (4), the top half DC value and bottom half DC value for a DCT block can be represented as $$\begin{aligned}(DC)_{top} &= \frac{1}{4}\sum_{m=0}^{3}\sum_{n=0}^{7} s(2m, n) = \frac{1}{4}\sum_{m=0}^{3} y(2m) \\ &= \frac{1}{4}\bigl[y(0) + y(2) + y(4) + y(6)\bigr] \\ &= (DC)_{00} + 0.1802(AC)_{10} + 0.2126(AC)_{30} + \\ &\quad 0.3182(AC)_{50} + 0.9061(AC)_{70}, \end{aligned} \qquad (7)$$

$$\begin{aligned}(DC)_{bottom} &= \frac{1}{4}\sum_{m=0}^{3}\sum_{n=0}^{7} s(2m+1, n) = \frac{1}{4}\sum_{m=0}^{3} y(2m+1) \\ &= \frac{1}{4}\bigl[y(1) + y(3) + y(5) + y(7)\bigr] \\ &= (DC)_{00} - 0.1802(AC)_{10} - 0.2126(AC)_{30} - \\ &\quad 0.3182(AC)_{50} - 0.9061(AC)_{70}, \end{aligned} \qquad (8)$$

where $(DC)_{top}$ and $(DC)_{bottom}$ are top half DC and bottom half DC values, respectively.

From equations (7) and (8), it is evident that only 5 coefficients are required to obtain top and bottom half DC values. It will be understood by those of ordinary skill in the art that a determination of whether or not higher frequency coefficients like $(AC)_{50}$ and $(AC)_{70}$ can be discarded or not can be made depending upon the magnitude of these coefficients, thereby forcing a trade-off between reduced-size image quality and the computational complexity involved in the construction of a reduced-size image. Overall, 5 additions, 4 multiplications and 0 shift are required to compute $(DC)_{top}$ and $(DC)_{bottom}$ for each frame DCT coded macroblock in an I-frame.

II. DC Image Extraction from I-Frame Coded as Field DCT

Two approaches are discussed.

A. First Approach

FIG. 10A is a diagram illustrating a technique for extracting reduced images from field DCT coded I-frames. An exemplary 16×16 macroblock 1010 is shown as being subdivided into a 2×2 array of four 8×8 DCT blocks with a first DCT block 1010A (BLOCK 0) at top left, a second DCT block 1010B (BLOCK 1) at top right, a third DCT block 1010C (BLOCK 2) at bottom left and a fourth DCT block 1010D (BLOCK 3) at bottom right. The DCT coefficients of the upper two DCT blocks 1010A and 1010B are reduced to a first 2×2 DCT coefficient array 1020A and the DCT coefficients of the lower two DCT blocks 1010C and 1010D are reduced to a second 2×2 DCT coefficient array 1020B. These first and second DCT blocks 1020A and 1020B are then used to produce a reduced-size pixel block 1030. The techniques by which the reduced DCT blocks 1020A and 1020B and the reduced-size pixel block 1030 are produced are described in greater detail hereinbelow.

The following terms are defined to aid in further discussion:

i-th DCT block: where i=0,1,2, or 3, indicating the 8×8 DCT block 1010A, 1010B, 1010C, or 1010D, respectively i-th pixel block: the 8×8 pixel block represented by the i-th DCT block $(DC_i)_{top}$: is the top half DC value for the i-th DCT block, equivalent to the "DC" or average value of a 4×8 array of pixels in the top half of an 8×8 pixel block represented by the i-th DCT block $(DC_i)_{bottom}$: is the bottom half DC value for the i-th DCT block, equivalent to the "DC" or average value of a 4×8 array of pixels in the bottom half of an 8×8 pixel block represented by the i-th DCT block $(DC_i)_{00}$: horizontal and vertical zero frequency DCT coefficient (DC or average value) for the i-th DCT block $(AC_i)_{mn}$: DCT coefficient for the m-th row and n-th column of the i-th DCT block (Note: $(DC_i)_{00}$ is equivalent to $(AC_i)_{00}$)

$(DC_i)$: "DC" or average value of all of the pixels in the i-th pixel block.

FIG. 10B is a diagram showing the organization of DCT coefficients in the leftmost row 1040 of each 8×8 DCT block (e.g., 1010A, 1010B, 1010C, or 1010D). A topmost DCT coefficient 1040A $(DC)_{00}$ is the horizontal and vertical zero frequency DCT coefficient. Proceeding downward, seven additional DCT coefficients are identified: 1040B $(AC)_{10}$, 1040C $(AC)_{20}$, 1040D $(AC)_{30}$, 1040E $(AC)_{40}$, 1040F $(AC)_{50}$, 1040G $(AC)_{60}$ and 1040H $(AC)_{70}$.

Equations (9)–(11) below are directed to the leftmost DCT blocks (1010A and 1010C) of the macroblock 1010. Those of ordinary skill in the art will understand that corresponding equations for the second and fourth DCT blocks (1010B, 1010D) are produced by making appropriate subscript substitutions.

Applying equation (6) with the above definitions in mind, $(DC_i)_{top}$ and $(DC_i)_{bottom}$ can be expressed as follows:

$$(DC_0)_{top} = \frac{1}{4}[y_0(0) + y_0(1) + y_0(2) + y_0(3)] \quad (9)$$

$$= (DC_0)_{00} + 0.9061(AC_0)_{10} - 0.3182(AC_0)_{30} + 0.2126(AC_0)_{50} - 0.1802(AC_0)_{70}$$

$$(DC_2)_{top} = \frac{1}{4}[y_0(4) + y_0(5) + y_0(6) + y_0(7)]$$

$$= (DC_0)_{00} - 0.9061(AC_0)_{10} + 0.3182(AC_0)_{30} - 0.2126(AC_0)_{50} + 0.1802(AC_0)_{70}$$

$$(DC_0)_{bottom} = \frac{1}{4}[y_2(0) + y_2(1) + y_2(2) + y_2(3)]$$

$$= (DC_2)_{00} + 0.9061(AC_2)_{10} - 0.3182(AC_2)_{30} + 0.2126(AC_2)_{50} - 0.1802(AC_2)_{70}$$

$$(DC_2)_{bottom} = \frac{1}{4}[y_2(4) + y_2(5) + y_2(6) + y_2(7)]$$

$$= (DC_2)_{00} - 0.9061(AC_2)_{10} + 0.3182(AC_2)_{30} - 0.2126(AC_2)_{50} + 0.1802(AC_2)_{70},$$

where $y_i(m)$ represents the sum (horizontally) of pixel values for an m-th row of the i-th pixel block, that is:

$$y_i(m) = \sum_{n=0}^{7} s_i(m, n).$$

From equations (9) above, it is evident that only five DCT coefficients are needed to calculate the each top half DC and bottom half DC value in equations (9). Since in equations (9), $(AC_i)_{10}$ is multiplied by a significanty larger constant than $(AC_i)_{30}$, $(AC_i)_{50}$ and $(AC_i)_{70}$ and since high frequency DCT coefficients are usually smaller than low frequency DCT coefficients, dropping the higher frequency DCT coefficients and using only the use of only first two coefficients, $(DC_i)_{00}$ and $(AC_i)_{10}$ produces top and bottom half DC values that are not significantly different from those produced when all of the DCT coefficients are used. Using this approximation, the top and bottom half DC values can be rewritten as $$(DC_0)_{top} = (DC_0)_{00} + \beta(AC_0)_{10}$$

$$(DC_2)_{top} = (DC_0)_{00} - \beta(AC_0)_{10}$$

$$(DC_0)_{bottom} = (DC_2)_{00} + \beta(AC_2)_{10}$$

$$(DC_2)_{bottom} = (DC_2)_{00} - \beta(AC_2)_{10}, \quad (10)$$

where $\beta = 0.9061$.

This reduction (approximation) is illustrated in FIG. 10A, where the top half reduced DCT block 1020A comprises the DCT coefficients $(DC_0)_{00}$, $(AC_0)_{10}$, $(DC_1)_{00}$ and $(AC_1)_{10}$.

From equation (10), the DC values (pixel block average) are:

$$(DC_0) = \frac{1}{2}[(DC_0)_{top} + (DC_0)_{bottom}] \quad (11)$$

$$= \frac{1}{2}[(DC_0)_{00} + (DC_2)_{00} + \beta[(AC_0)_{10} + (AC_2)_{10}]]$$

$$(DC_2) = \frac{1}{2}[(DC_2)_{top} + (DC_2)_{bottom}]$$

$$= \frac{1}{2}[(DC_0)_{00} + (DC_2)_{00} - \beta[(AC_0)_{10} + (AC_2)_{10}]].$$

Overall, 4 additions, 2 multiplications and 0 shift are needed for equation (10), and 2 additions and 2 shifts are required for equation (11). In total, 6 additions, 2 multiplications and 2 shifts are necessary to calculate $(DC_0)$, $(DC_2)$ and half DC values. Thus, for each 8×8 DCT block, 3 additions, 1 multiplication and 1 shift are required to produce DC values.

B. Second Approach

A second approach for calculating top and bottom half DC values comprises reducing the horizontal and vertical resolution of 8×8 DCT blocks by ⅛ and by ¼, respectively, yielding a 2×1 reduced-sized image for each DCT block representing top and bottom half DC values for the 8×8 DCT block.

FIG. 11A is a diagram showing a top half 1110A of a field DCT coded macroblock comprising two DCT blocks 1110AA and 1111AB. These two DCT blocks are reduced to a 2×2 pixel block 1120A by a technique described below.

Similarly, FIG. 11B is a diagram showing a bottom half 1110B of a field DCT coded macroblock comprising two DCT blocks 1110BA and 1110BB. These two DCT blocks are reduced to a 2×2 pixel block 1120B by a technique described below.

The reduction of image resolution in the horizontal direction by ⅛ can be achieved by multiplying $\sqrt{8}$ to each of the first coefficients. To reduce resolution by ⅛ in the vertical direction, 2-point IDCTs are performed as follows:

$$(DC_0)_{top} = \frac{1}{\sqrt{8}} \sum_{k=0}^{1} a(k)(\sqrt{8} Y_0(k)) \cos\frac{k\pi}{4} \quad (12)$$

-continued $$= (DC_0)_{00} + (AC_0)_{10}$$

$$(DC_2)_{top} = \frac{1}{\sqrt{8}} \sum_{k=0}^{1} a(k)(\sqrt{8}\, Y_2(k)) \cos\frac{3k\pi}{4}$$

$$= (DC_0)_{00} - (AC_0)_{10}.$$

The bottom half DC values are obtained similarly:

$$(DC_0)_{bottom} = (DC_2)_{00} + (AC_2)_{10}$$

$$(DC_2)_{bottom} = (DC_2)_{00} - (AC_2)_{10}. \tag{13}$$

Top and bottom half DC values for other DCT blocks are obtained similarly.

"DC" average values for the DCT blocks can be computed as follows:

$$(DC_0) = \frac{1}{2}\left[(DC_0)_{top} + (DC_0)_{bottom}\right] \tag{14}$$

$$= \frac{1}{2}\left[(DC_0)_{00} + (DC_2)_{00} + (AC_0)_{10} + (AC_2)_{10}\right]$$

$$(DC_2) = \frac{1}{2}\left[(DC_2)_{top} + (DC_2)_{bottom}\right]$$

$$= \frac{1}{2}\left[(DC_0)_{00} + (DC_2)_{00} - (AC_0)_{10} + (AC_2)_{10}\right].$$

This method of extraction of DC values from a field DCT macroblock requires only the simple operations of addition and shift. Only 3 additions, 1 shift and no multiplication are required to obtain the values of DC, top half DC and bottom half DC for an 8×8 DCT block.

FIG. 12 is a flow chart showing the steps of extracting a reduced-size image from an intra-coded frame (I-frame). For the case where only I-frames are used to produce reduced-sized images, the values of DC, top half DC and bottom half DC are sufficient, since I-frames are "self-contained", that is, no information is required from other frames. In a first step 1210, $(DC_i)_{00}$ and $(AC_i)_{10}$ DCT coefficient values are taken for each DCT block of the I-frame. In a next step 1220, it is determined whether macroblocks of the I-frame are field coded or frame coded. If frame coding is employed, then a next step 1230 derives DC, top half DC and bottom half DC values for each DCT block by the frame method described hereinabove. If field coding is employed, then a next step 1240 derives DC, top half DC and bottom half DC values for each DCT block by the field method described hereinabove.

The field image/picture obtained by using either top half DC values only or bottom half DC values only (but not both) often gives better reduced-sized image quality than the de-interlaced DC values especially when there is motion between top and bottom fields. Therefore, a single field image (top or bottom) can be effectively used to produce thumbnails (1/64 size of the original frame by area) for video browsing, video summary, fast thumbnail playback and video indexing.

In the case of extracting the reduced-size images from only I frames, a preferred embodiment is to construct the reduced image by obtaining either top half DC value or bottom half DC value (not both) for the field coded macroblock, and by using only a DC value without calculating top half DC value and bottom half DC value for the frame coded macroblock. Thus, the reduced image can be fast generated. One of the applications utilizing reduced images is automatic shot boundary detection of MPEG-2 encoded video stream using correlation between adjacent reduced images constructed only from I frames.

This provides a highly efficient technique for producing 64:1 reduced-size images (8:1 linear reduction) using only I-frame (intra-coded) macroblocks, employing the reduced-size image generation techniques described hereinabove. For field DCT coded macroblocks, reduced-size images are produced using only half DC values (either top half DC or bottom half DC, but not both), without calculating unused values. For frame DCT coded macroblocks, reduced-size images are produced using only DC (average) values, without calculating half-DC values. These techniques greatly reduce the amount of computation required to produce reduced-size images, consequently reducing the time and/or hardware resources required to produce the reduced-size images.

The techniques described hereinabove can also be adapted to produce 16:1 reduced-size images (256:1 reduction by area) with only slight degradation in image quality. A 16:1 reduction can be achieved by producing a single pixel in a reduced image for each 16×16 macroblock in an original image. A straightforward method for producing such a 16:1 linear reduction would be to produce "DC" images (8:1 linear reduction by any of the techniques described hereinabove), then to produce a further 2:1 linear reduction (4:1 by area) of the reduced image by pixel averaging. This pixel averaging effectively reduces each 16×16 macroblock to a single pixel in the reduced image. A disadvantage of this technique is that it requires that all of the DCT blocks in all of the macroblocks of the original image be decoded, including VLC decoding and dequantization.

FIG. 13 is a diagram illustrating a technique for producing reduced-size images with a 16:1 linear reduction, wherein only half of the macroblocks of an image are decoded. An exemplary (typical) 8×8 reduced-size image 1300 comprises a 12 high by 22 wide array of reduced pixels 1310 such that each reduced pixel 1310 represents an 8×8 pixel block in an original I-frame image from which the reduced-size image was derived. Each 2×2 pixel block 1330 of the reduced-size image represents an 8:1 linear reduction of a 16×16 macroblock in the original image. Based on the 12×22 size of the reduced-size image 1300, the original image comprised a 6 high×11 wide array of 16×16 macroblocks (96×176 pixels—much smaller than most video images, but suitable for illustrative purposes). Shaded areas 1320A, 1320C and 1320E encompass reduced pixels 1310 derived from first, third and fifth rows of macroblocks in the original image. Non-shaded areas 1320B, 1320D and 1320F encompass reduced pixels 1310 derived from second, fourth and sixth rows of macroblocks in the original image.

To produce a 16:1 reduced-size image from the 8:1 reduced-size image 1300, it is only necessary to use reduced pixels 1310 either from the shaded areas (1320A, 1320C, 1320E) or from the non-shaded areas (1320B, 1320D, 1320F). Assuming that the shaded areas (1320A, 1320C, 1320E) are used, each 2×2 reduced pixel block 1330 in the shaded area (corresponding to four "DC" values from a 16×16 macroblock in the original image) is reduced to a 2(high)×1(wide) pixel block in the 16:1 reduced-size image by either sampling alternate pixel values or by averaging pixel values horizontally. The non-shaded areas are skipped by using the "slice start code" of MPEG-2 encoding (or other suitable similar position indicator for other encoding schemes), which encodes the vertical position of macroblocks. For the exemplary 12×12 reduced-size image 1300 of FIG. 13, the yields 3 rows of 112×1 pixel blocks which when stored in an output reduced-size image form a 6×11 reduced-size image, a 2:1 linear size reduction from the 8:1 reduced-size image 1300, and a 16:1 linear size reduction from the original image.

Those of ordinary skill in the art will appreciate that since the goal is to produce a 16:1 reduced-size image, not an 8:1 reduced-size image, the 8:1 reduced-size image 1300 of FIG. 13 is provided only for visualization purposes. Macroblocks for pixels areas in the 8:1 reduced-size image that are not used in the computation of the 16:1 reduced-size area need not be decoded, thereby reducing the computational load by a factor of at least two over techniques that require that all macroblocks be decoded. Although this method lowers reduced-sized image quality somewhat, due to skipped rows, the resulting reduced-sized image quality after post-processing is similar to that of reduced-size images produced by the "straightforward" averaging method, but requires that only half as many macroblocks be decoded.

III. DC Image Extraction from P and B Frames

Whereas I-frames are completely self-contained and produce complete images without reference to any other frame, P-frames and B-frames encode differences between a "reference" I-frame image and the desired P- or B-frame image. Reduced-size images from P-frames and B-frames are readily produced by employing the half DC value techniques described hereinabove with respect to I-frame images. Regardless of whether a reference I-frame macroblock is field DCT coded block or frame DCT coded, the DC and half DC values for a current P-frame or B-frame macroblock can efficiently be derived by using only half DC values and motion compensation information.

Since frame-based motion compensation can be viewed as two successive field-based motion compensations, and further motion vectors for each field can be easily derived for different motion compensation modes in MPEG-2, the following description is directed to field-based motion compensation.

16×8 motion compensation uses at least two motion vectors for each macroblock: one vector is used for the upper 16×8 region and one for the lower half. In the case of B-pictures a total of four motion vectors are used for each macroblock in this mode, since both the upper and lower regions may each have motion vectors referring to past and future pictures. This mode is permitted only in field-structured pictures and, in such cases, is intended to allow the spatial area that is covered by each motion vector to be approximately equal to that of a 16×16 macroblock in a frame-structured picture.

In field-based motion compensation, two motion vectors (top and bottom field motion vector) are required. In dual-prime mode, only one motion vector and its differential offset are transmitted. Thus, real motion vectors are calculated as "transmitted motion vector+offset" and "transmitted motion vector−offset". These two calculated motion vectors serve as top and bottom field motion vectors for the macroblock in dual-prime mode. Therefore the treatment for dual-prime mode is same as the field-based motion compensation since the two motion vectors for each field can be calculated from one transmitted motion vector and its offset.

P-frames and B-frames are essentially "delta coded" relative to reference I-frames with motion compensation information. Motion vectors associated with P-frame and B-frame encoding identify positional offsets of blocks within the P-frames and/or B-frames relative to reference I-frames. This positional offset is used to select and copy specific areas within the reference I-frames into blocks of the P-frame or B-frame image. The copied blocks are used as a starting point. DCT blocks within the P-frames and B-frames encode differences between the copied blocks and the desired image, thereby "delta coding" the P-frames and B-frames relative to the reference I-frames. The "difference image" blocks resulting from decoding of DCT blocks in P-frames and B-frames is added to the image blocks copied from the reference I-frames to form the final target frame. This form of coding, where B-frames and P-frames are encoded relative to reference I-frames, is known as "inter" coding.

When an inter-coded block of interest in a P-frame or a B-frame references an "anchor" block in an I-frame with field-based motion compensation, motion vector information encoded into the P-frame or B-frame must be employed to produce "DC" images (average value and/or half-DC value based reduced-size images). While the first-order approximation expressed in equation (3) provides a good solution for non-interlace images encoded according to the MPEG-1 standard, interlaced field encoding in MPEG-2 necessitates a different approach.

The present inventive technique employs an approach similar to the first-order approximation described hereinabove to derive "DC" images from MPEG-2 video streams. In motion-compensation for field-based DCT encoding, separate motion vectors are used in the "prediction" of the relative position change between an "anchor" block in an I-frame and top and bottom fields images of a macroblock. Each of the half DC values for the "anchor" block corresponds to the average value of a 4×8 pixel block that the anchor block represents, and is kept in memory to facilitate the production of reduced-size images. The aforementioned first-order approximation technique is applied to the half DC values of the anchor block in the manner described hereinbelow.

FIG. 14 is a diagram illustrating a representative case where top and bottom fields of a P-frame 1420 reference bottom and top fields 1430 and 1410, respectively, of an I-frame. A top field motion vector $(w_0, h_0)$ defines a positional offset in the I-frame bottom field 1410 of a bottom field "anchor" block 1412 relative to the position of a target block 1422 in the P-frame 1420. Similarly, a bottom field motion vector $(w_o', h_o')$ defines a positional offset in the I-frame top field 1430 of a top field "anchor" block 1432 relative to the position of the target block 1422 in the P-frame 1420. Due to the position change, the "anchor" block 1412 overlaps encoded 8×8 blocks D0, D1, D2 and D3 in the I-frame bottom field 1410 by horizontal and vertical amounts shown in the figure as w0, h0, w1, h1, w2, h2, w3 and h3. Similarly, the "anchor" block 1432 overlaps encoded 8×8 blocks D0', D1', D2' and D3' in the I-frame top field 1430 by horizontal and vertical amounts shown in the Figure as w0', h0', w1', h1', w2', h2', w3' and h3'. From the known sizes of the blocks (target, anchor blocks) and the horizontal and vertical coefficients of the motion vectors $(w_0, h_0)$ and $(w_{0'}, h_{0'})$, the remaining offset amounts w1, h1, w2, h2, w3, h3, w1', h1', w2', h2', w3' and h3' are readily calculated.

Top half DC, bottom half DC and DC values for the target block 1422 can be calculated as follows:

$$(DC)_{top} = \frac{1}{32}\left(\left\lfloor\frac{h_0}{2}\right\rfloor[w_0(DC_0)_b + w_1(DC_1)_b] + \right. \tag{15}$$

$$\left.\left\lfloor\frac{h_2}{2}\right\rfloor[w_2(DC_2)_b + w_3(DC_3)_b]\right)$$

$$(DC)_{bottom} = \frac{1}{32}\left(\left\lfloor\frac{h_0'}{2}\right\rfloor[w_0'(DC_0')_t + w_1'(DC_1')_t] + \right.$$

-continued $$\left\lceil \frac{h'_2}{2} \right\rceil \left[ w'_2 (DC'_2)_t + w'_3 (DC'_3)_t \right] \Big)$$

$$(DC) = \frac{1}{2} \left[ (DC)_{top} + (DC)_{bottom} \right]. \quad (16)$$

where:

$(DC_x)_b$ is the bottom half DC value for 8×8 block Dx (x=0, 1, 2 or 3), and $(DC_x')_t$ is the top half DC value for 8×8 block Dx' (x=0, 1, 2 or 3)

Simultaneously computing all of the half DC values for a target macroblock requires a smaller number of multiplications than individually computing half DC values for each 8×8 block using equations (15).

FIG. 15 is a diagram illustrating a portion of an I-frame image 1510 comprising a 3×3 array of 8×8 blocks, labeled $D_0$, $D_1$, $D_2$, $D_3$, $D_5$, $D_6$, $D_7$ and $D_8$. (A block $D_4$ in the center of the 3×3 array is obscured in the figure, but is assumed to be present). Four 8×8 blocks ($E_0'$, $E_1'$, $E_2'$ and $E_3'$) of a target macroblock 1520B of a P-frame reference a 4×4 block area (the blocks are labeled $E_1$, $E_2$, $E_3$ and $E_4$) 1520A of the I-frame image 1510. Due to motion compensation the four blocks $E_0$, $E_1$, $E_2$ and $E_3$ are not aligned with the blocks $D_0$–$D_8$ of the I-frame, overlapping them. Block $E_0$ overlaps blocks $D_0$, $D_1$, $D_3$ and $D_4$ ($D_4$ is obscured in the Figure, but assumed to be present). Block $E_1$ overlaps blocks $D_1$, $D_2$, $D_4$ and $D_5$. Block $E_2$ overlaps blocks $D_3$, $D_4$, $D_6$ and $D_7$. Block $E_3$ overlaps blocks $D_4$, $D_5$, $D_7$ and $D_8$.

By using the relationship between blocks in a macroblock, blocks E0, E1, E2 and E3 are represented in matrix form as follows:

$$E_0 = H_0(D_0 - D_1 - D_3 + D_4)W_0 + H_0(D_1 - D_4) \cdot P^0 + P^1(D_3 - D_4)W_0 + P^1 D_4 P^0$$

$$E_1 = H_0(D_2 - D_1 - D_5 + D_4)W_1 + H_0(D_1 - D_4) \cdot P^0 + P^1(D_5 - D_4)W_1 + P^1 D_4 P^0$$

$$E_2 = H_2(D_6 - D_7 - D_3 + D_4)W_0 + H_2(D_7 - D_4) \cdot P^0 + P^1(D_3 - D_4)W_0 + P^1 D_4 P^0$$

$$E_3 = H_2(D_8 - D_7 - D_5 + D_4)W_1 + H_2(D_7 - D_4) \cdot P^0 + P^1(D_5 - D_4)W_1 + P^1 D_4 P^0, \quad (17)$$

where $$H_0 = \begin{pmatrix} 0 & I_{h_0} \\ 0 & 0 \end{pmatrix} \quad H_2 = \begin{pmatrix} 0 & 0 \\ I_{h_2} & 0 \end{pmatrix} \quad W_0 = \begin{pmatrix} 0 & 0 \\ I_{w_0} & 0 \end{pmatrix} \quad W_1 = \begin{pmatrix} 0 & I_{w_1} \\ 0 & 0 \end{pmatrix},$$

$$P^0 = W_0 + W_1, \quad P^1 = H_0 + H_2$$

and $I_{hi}$ and $I_{wi}$ represents an hi×hi identity matrix and $w_i \times w_i$ identity matrix, respectively.

By using the first-order approximation for the half DC and equation (16) during motion compensation as shown and described hereinabove with respect to FIG. 14, the top half DC values can be expressed as:

$$(DC_{E_0})_t = \frac{1}{32} \left[ \left\lceil \frac{h_0}{2} \right\rceil w_0 \left[ (DC_{D0})_b - (DC_{D1})_b - (DC_{D3})_b + (DC_{D4})_b \right] + \right. \quad (18)$$

$$8 \times \left\lceil \frac{h_0}{2} \right\rceil \left[ (DC_{D1})_b - (DC_{D4})_b \right] +$$

$$\frac{1}{32} \left[ 4 \times w_0 \left[ (DC_{D3})_b - (DC_{D4})_b \right] + 32 \times (DC_{D4})_b \right]$$

$$(DC_{E_1})_t = \frac{1}{32} \left[ \left\lceil \frac{h_0}{2} \right\rceil w_1 \left[ (DC_{D2})_b - (DC_{D1})_b - (DC_{D5})_b + (DC_{D4})_b \right] + \right.$$

$$8 \times \left\lceil \frac{h_0}{2} \right\rceil \left[ (DC_{D1})_b - (DC_{D4})_b \right] +$$

$$\frac{1}{32} \left[ 4 \times w_1 \left[ (DC_{D5})_b - (DC_{D4})_b \right] + 32 \times (DC_{D4})_b \right]$$

$$(DC_{E_2})_t = \frac{1}{32} \left[ \left\lceil \frac{h_2}{2} \right\rceil w_0 \left[ (DC_{D6})_b - (DC_{D7})_b - (DC_{D3})_b + (DC_{D4})_b \right] + \right.$$

$$8 \times \left\lceil \frac{h_2}{2} \right\rceil \left[ (DC_{D7})_b - (DC_{D4})_b \right] +$$

$$\frac{1}{32} \left[ 4 \times w_0 \left[ (DC_{D3})_b - (DC_{D4})_b \right] + 32 \times (DC_{D4})_b \right]$$

$$(DC_{E_3})_t = \frac{1}{32} \left[ \left\lceil \frac{h_2}{2} \right\rceil w_1 \left[ (DC_{D8})_b - (DC_{D7})_b - (DC_{D5})_b + (DC_{D4})_b \right] + \right.$$

$$8 \times \left\lceil \frac{h_2}{2} \right\rceil \left[ (DC_{D7})_b - (DC_{D4})_b \right] +$$

$$\frac{1}{32} \left[ 4 \times w_0 \left[ (DC_{D5})_b - (DC_{D4})_b \right] + 32 \times (DC_{D4})_b \right]$$

where:

$(DC_X)_t$ is the top half DC value for block 'X' and $(DC_X)_b$ is the bottom half DC value for block 'X' and Similarly, the bottom half DC values can be expressed as:

$$(DC_{E_0})_b = \frac{1}{32} \left[ \left\lceil \frac{h'_o}{2} \right\rceil w_0 \left[ (DC_{D0})_t - (DC_{D1})_t - (DC_{D3})_t + (DC_{D4})_t \right] + \right. \quad (19)$$

$$8 \times \left\lceil \frac{h'_o}{2} \right\rceil \left[ (DC_{D1})_t - (DC_{D4})_t \right] +$$

$$\frac{1}{32} \left[ 4 \times w_0 \left[ (DC_{D3})_t - (DC_{D4})_t \right] + 32 \times (DC_{D4})_t \right]$$

$$(DC_{E_1})_b = \frac{1}{32} \left[ \left\lceil \frac{h'_o}{2} \right\rceil w_1 \left[ (DC_{D2})_t - (DC_{D1})_t - (DC_{D5})_t + (DC_{D4})_t \right] + \right.$$

$$8 \times \left\lceil \frac{h'_o}{2} \right\rceil \left[ (DC_{D5})_t - (DC_{D4})_t \right] +$$

$$\frac{1}{32} \left[ 4 \times w_1 \left[ (DC_{D5})_t - (DC_{D4})_t \right] + 32 \times (DC_{D4})_t \right]$$

$$(DC_{E_2})_b = \frac{1}{32} \left[ \left\lceil \frac{h'_2}{2} \right\rceil w_0 \left[ (DC_{D6})_t - (DC_{D7})_t - (DC_{D3})_t + (DC_{D4})_t \right] + \right.$$

$$8 \times \left\lceil \frac{h'_2}{2} \right\rceil \left[ (DC_{D7})_t - (DC_{D4})_t \right] +$$

$$\frac{1}{32} \left[ 4 \times w_0 \left[ (DC_{D3})_t - (DC_{D4})_t \right] + 32 \times (DC_{D4})_t \right]$$

$$(DC_{E_3})_b = \frac{1}{32} \left[ \left\lceil \frac{h'_2}{2} \right\rceil w_1 \left[ (DC_{D8})_t - (DC_{D7})_t - (DC_{D5})_t + (DC_{D4})_t \right] + \right.$$

-continued $$8 \times \left\lfloor \frac{h'_2}{2} \right\rfloor \left[ (DC_{D7})_t - (DC_{D4})_t \right] +$$

$$\frac{1}{32} \left[ 4 \times w_1 \left[ (DC_{D5})_t - (DC_{D4})_t \right] + 32 \times (DC_{D4})_t \right]$$

In the interest of computational efficiency, equations (18) and (19) can be rewritten as follows:

$$(DC_{E_0})_t = \frac{1}{32} \left[ \left\lfloor \frac{h_0}{2} \right\rfloor w_0 \left[ (DC_{D0})_b - (A_0)_b - (DC_{D3})_b \right] + (C_0)_b + (D_0)_b \right] \quad (20)$$

$$(DC_{E_1})_t = \frac{1}{32} \left[ \left\lfloor \frac{h_0}{2} \right\rfloor w_1 \left[ (DC_{D2})_b - (A_0)_b - (DC_{D5})_b \right] + (C_0)_b + (D_1)_b \right]$$

$$(DC_{E_2})_t = \frac{1}{32} \left[ \left\lfloor \frac{h_2}{2} \right\rfloor w_0 \left[ (DC_{D6})_b - (A_3)_b - (DC_{D3})_b \right] + (C_1)_b + (D_0)_b \right]$$

$$(DC_{E_3})_t = \frac{1}{32} \left[ \left\lfloor \frac{h_2}{2} \right\rfloor w_1 \left[ (DC_{D8})_b - (A_3)_b - (DC_{D5})_b \right] + (C_1)_b + (D_1)_b \right]$$

$$(DC_{E_0})_b = \frac{1}{32} \left[ \left\lfloor \frac{h'_0}{2} \right\rfloor w_0 \left[ (DC_{D0})_t - (A_0)_t - (DC_{D3})_t \right] + (C_0)_t + (D_0)_t \right] \quad (21)$$

$$(DC_{E_1})_b = \frac{1}{32} \left[ \left\lfloor \frac{h'_0}{2} \right\rfloor w_1 \left[ (DC_{D2})_t - (A_0)_t - (DC_{D5})_t \right] + (C_0)_t + (D_1)_t \right]$$

$$(DC_{E_2})_t = \frac{1}{32} \left[ \left\lfloor \frac{h'_2}{2} \right\rfloor w_0 \left[ (DC_{D6})_t - (A_3)_t - (DC_{D3})_t \right] + (C_1)_t + (D_0)_t \right]$$

$$(DC_{E_3})_t = \frac{1}{32} \left[ \left\lfloor \frac{h'_2}{2} \right\rfloor w_1 \left[ (DC_8)_t - (A_3)_t - (DC_5)_t \right] + (C_1)_t + (D_1)_t \right],$$

$$(DC_{E_0})_b = \frac{1}{32} \left[ \left\lfloor \frac{h'_0}{2} \right\rfloor w_0 \left[ (DC_{D0})_t - (A_0)_t - (DC_{D3})_t \right] + (C_0)_t + (D_0)_t \right]$$

$$(DC_{E_1})_b = \frac{1}{32} \left[ \left\lfloor \frac{h'_0}{2} \right\rfloor w_1 \left[ (DC_{D2})_t - (A_0)_t - (DC_{D5})_t \right] + (C_0)_t + (D_1)_t \right]$$

$$(DC_{E_2})_b = \frac{1}{32} \left[ \left\lfloor \frac{h'_2}{2} \right\rfloor w_0 \left[ (DC_{D6})_t - (A_3)_t - (DC_{D3})_t \right] + (C_1)_t + (D_0)_t \right]$$

$$(DC_{E_3})_b = \frac{1}{32} \left[ \left\lfloor \frac{h'_2}{2} \right\rfloor w_1 \left[ (DC_{D8})_t - (A_3)_t - (DC_{D5})_t \right] + (C_1)_t + (D_1)_t \right],$$

where $(A_0)_b = (DC_1)_b - (DC_4)_b, \quad (A_1)_b = (DC_3)_b - (DC_4)_b$ $(A_2)_b = (DC_5)_b - (DC_4)_b, \quad (A_3)_b = (DC_7)_b - (DC_4)_b$ $(B)_b = 32(DC_4)_b$ $(C_0)_b = 8 \left\lfloor \frac{h_o}{2} \right\rfloor (A_0)_b + (B)_b, \quad (C_1)_b = 8 \left\lfloor \frac{h_2}{2} \right\rfloor (A_3)_b + (B)_b$ $(D_0)_b = 4w_0(A_1)_b, \quad (D_1)_b = 4w_1(A_2)_b$ $(A_0)_b = (DC_{D1})_b - (DC_{D4})_b, \quad (A_1)_b = (DC_{D3})_b - (DC_{D4})_b$ $(A_2)_b = (DC_{D5})_b - (DC_{D4})_b, \quad (A_3)_b = (DC_{D7})_b - (DC_{D4})_b$ $(B)_b = 32(DC_{D4})_b$ $(C_0)_b = 8 \left\lfloor \frac{h_o}{2} \right\rfloor (A_0)_b + (B)_b, \quad (C_1)_b = 8 \left\lfloor \frac{h_2}{2} \right\rfloor (A_3)_b + (B)_b$ $(D_0)_b = 4w_0(A_1)_b, \quad (D_1)_b = 4w_1(A_2)_b$ $(A_0)_t = (DC_1)_t - (DC_4)_t, \quad (A_1)_t = (DC_3)_t - (DC_4)_t$ $(A_2)_t = (DC_5)_t - (DC_4)_t, \quad (A_3)_t = (DC_7)_t - (DC_4)_t$ $(B)_t = 32(DC_4)_t$ $(C_0)_t = 8 \left\lfloor \frac{h'_0}{2} \right\rfloor (A_0)_t + (B)_t, \quad (C_1)_t = 8 \left\lfloor \frac{h'_2}{2} \right\rfloor (A_3)_t + (B)_t$ $(D_0)_t = 4w_0(A_1)_t, \quad (D_1)_t = 4w_1(A_2)_t$ $(A_0)_t = (DC_{D1})_t - (DC_{D4})_t, \quad (A_1)_t = (DC_{D3})_t - (DC_{D4})_t$ $(A_2)_t = (DC_{D5})_t - (DC_{D4})_t, \quad (A_3)_t = (DC_{D7})_t - (DC_{D4})_t$ $(B)_t = 32(DC_{D4})_t$ $(C_0)_t = 8 \left\lfloor \frac{h'_0}{2} \right\rfloor (A_0)_t + (B)_t, \quad (C_1)_t = 8 \left\lfloor \frac{h'_2}{2} \right\rfloor (A_3)_t + (B)_t$ $(D_0)_t = 4w_0(A_1)_t, \quad (D_1)_t = 4w_1(A_2)_t$ The following terms are computed once for each macroblock:

$$8 \left\lfloor \frac{h_0}{2} \right\rfloor, 8 \left\lfloor \frac{h_2}{2} \right\rfloor, 8 \left\lfloor \frac{h'_o}{2} \right\rfloor, 8 \left\lfloor \frac{h'_2}{2} \right\rfloor, \left\lfloor \frac{h_0}{2} \right\rfloor w_o, \left\lfloor \frac{h_0}{2} \right\rfloor w_1, \left\lfloor \frac{h_2}{2} \right\rfloor w_0,$$

$$\left\lfloor \frac{h_2}{2} \right\rfloor w_1, \left\lfloor \frac{h'_o}{2} \right\rfloor w_0, \left\lfloor \frac{h'_o}{2} \right\rfloor w_1, \left\lfloor \frac{h'_2}{2} \right\rfloor w_0, \left\lfloor \frac{h'_2}{2} \right\rfloor w_1 \text{ and } 4w_1.$$

Evidently, computation of the four top half DC values for a macroblock requires 8 multiplications, 22 additions and 25 shifts. The bottom half DC values require the same number of computations. Therefore, 4 multiplications, 11 additions and 12.25 shifts are required to calculate half DC values for an 8×8 block. Additionally, computation of the DC value requires one addition and one shift assuming that the half DC values have already been computed.

FIG. 16 is a flow chart 1600 illustrating the steps of extracting DC images for macroblocks of P-frames and B-frames. In a first step 1610, the $DC_{00}$ and $AC_{10}$ DCT coefficients are decoded from the macroblock and retained as described hereinabove. In a next step 1620, it is determined whether the macroblock is inter-coded (P-frame or B-frame) or intra-coded (I-frame). If it is intra-coded, processing proceeds as described hereinabove with respect to the flowchart of FIG. 12. A next step 1630, determines whether the intra-coded macroblock is field DCT encoded or frame DCT encoded. If it is frame DCT encoded, a next step 1640 calculates top DC (top average), bottom DC (bottom average) and DC (average) values for the macroblock by the frame method described hereinabove. If the macroblock is field DCT encoded, a next step 1650 calculates top DC (top average), bottom DC (bottom average) and DC (average) values for the macroblock by the field method described hereinabove.

If the macroblock is inter-coded, then a next step 1660 calculates top DC (top average), bottom DC (bottom average) and DC (average) values from a motion compensated reference I-frame image as described hereinabove with respect to FIGS. 14 and 15. A next step 1670 processing the residual error terms (difference image information) encoded into the DCT blocks of the macroblocks to determine top DC, bottom DC and DC values for a difference image. The DCT blocks of the inter-coded macroblock are processed in exactly the same way as shown and described hereinabove with respect to FIG. 12 (effectively reproducing the steps 1630, 1640 and 1650). The resultant top DC, bottom DC and DC values are added to the top DC, bottom DC and DC values obtained in the previous step 1660, thereby producing final top DC, bottom DC and DC values for the inter-coded macroblock.

IV. One-Sixteenth Reduced-Sized Image from I-Frame Coded as Frame DCT

To produce one-sixteenth (by area) reduced-sized images (4:1×4:1 linear reduction) from a frame DCT coded I-frame, a 2-point IDCT is performed in the both the horizontal and vertical directions.

FIG. 17A is a diagram illustrating an 8×8 DCT block 1710A comprising 64 DCT coefficients $y_{uv}$ (u,v=0, 1, 2, . . . , 7. u,v are row and column numbers, respectively) and a 2×2 reduced-size block image 1720A comprising four pixel values $R_{xy}$, ($R_{00}$, $R_{01}$, $R_{10}$ and $R_{11}$, where 'x' and 'y' are horizontal and vertical pixel positions, respectively). The pixel values for the 2×2 reduced-size image 1720A are obtained by performing 2-point IDCTs on selected DCT coefficients of the 8×8 DCT block 1710A, as follows:

$$R_{00} = \frac{1}{8}\sum_{u=0}^{1}\sum_{v=0}^{1} a(u)b(v)Y(u,v)\cos\frac{u\pi}{4}\cos\frac{v\pi}{4} = \frac{1}{8}(A_0 + A_1) \quad (22)$$

$$R_{01} = \frac{1}{8}\sum_{u=0}^{1}\sum_{v=0}^{1} a(u)b(v)Y(u,v)\cos\frac{u\pi}{4}\cos\frac{3v\pi}{4} = \frac{1}{8}(B_0 + B_1)$$

$$R_{10} = \frac{1}{8}\sum_{u=0}^{1}\sum_{v=0}^{1} a(u)b(v)Y(u,v)\cos\frac{3u\pi}{4}\cos\frac{v\pi}{4} = \frac{1}{8}(A_0 - A_1)$$

$$R_{11} = \frac{1}{8}\sum_{u=0}^{1}\sum_{v=0}^{1} a(u)b(v)Y(u,v)\cos\frac{3u\pi}{4}\cos\frac{3v\pi}{4} = \frac{1}{8}(B_0 - B_1)$$

where:

Y(u,v) is the DCT coefficient in the u-th row and v-th column $y_{uv}$ of the 8×8 DCT block 1710A

$R_{xy}$ is the pixel value in the x-th row and y-th column of the 2×2 reduced-size image block 1720A, $A_u = y_{u0} + y_{u1}$, $B_u = Y_{u0} - y_{u1}$, $$a(u) = \begin{cases} 1, & \text{when } u = 0 \\ \sqrt{2}, & \text{otherwise} \end{cases}, b(v) = \begin{cases} 1, & \text{when } v = 0 \\ \sqrt{2}, & \text{otherwise} \end{cases}.$$

From equations (22), it is evident that only 8 additions and 4 shifts are required to obtain the 2×2 reduced-size image block 1720A from the 8×8 block frame DCT coded block 1710A.

An alternative method for producing one-sixteenth reduced-sized images from a frame DCT code I-frame is to use a modified IDCT kernel. Taking an exemplary 1-dimensional case, 8 pixels are reduced to 2 pixels by averaging. This averaging is related to IDCT as follows:

$$R(n) = \frac{1}{4}[x(4n) + x(4n+1) + x(4n+2) + x(4n+3)] \quad (23)$$

$$= \frac{1}{4}\sum_{k=0}^{7} \frac{a(k)}{\sqrt{8}} X(k)\left[\cos\frac{(8n+1)k\pi}{16} + \cos\frac{(8n+3)k\pi}{16} + \right.$$

-continued $$\left. \cos\frac{(8n+5)k\pi}{16} + \cos\frac{(8n+7)k\pi}{16} \right]$$

$$= \sum_{k=0}^{7} \frac{a(k)}{\sqrt{8}} X(k)\cos\frac{k\pi}{16}\cos\frac{k\pi}{8}\cos\frac{(2n+1)k\pi}{4}$$

$$\approx \sum_{k=0}^{1} \frac{a(k)}{\sqrt{8}} X(k)\cos\frac{k\pi}{16}\cos\frac{k\pi}{8}\cos\frac{(2n+1)k\pi}{4}$$

$$= \sum_{k=0}^{1} \frac{a(k)}{\sqrt{8}} X'(k)\cos\frac{(2n+1)k\pi}{4} \qquad n = 0, 1.$$

where:

X(k) is the $k^{th}$ one-dimensional DCT coefficient of an 8-point linear DCT array, x(n) is the $n^{th}$ pixel in a "full size" 8-pixel linear image represented by the DCT array, R(n) is the $n^{th}$ pixel value of a 2 pixel reduced-size linear image $$a(k) = \begin{cases} 1, & \text{when } k = 0 \\ \sqrt{2}, & \text{otherwise} \end{cases} \text{ and } X'(k) = X(k)\cos\frac{k\pi}{16}\cos\frac{k\pi}{8}.$$

For the one dimensional case shown in equations (23), an 8-point IDCT is modified to a 4-point IDCT by using modified DCT coefficients X'(k). This one-dimensional case is readily extended to two dimensions. In the two-dimensional case, a reduced-size 2×2 pixel image is produced by averaging, as follows:

$$R(m,n) = \frac{1}{16}[x(4m, 4n) + x(4m, 4n+1) + x(4m, 4n+2) + \quad (24)$$
$$x(4m, 4n+3) + x(4m+1, 4n) + x(4m+1, 4n+1) +$$
$$x(4m+1, 4n+2) + x(4m+1, 4n+3) + x(4m+2, 4n) +$$
$$x(4m+2, 4n+1) + x(4m+2, 4n+2) +$$
$$x(4m+2, 4n+3) + x(4m+3, 4n) + x(4m+3, 4n+1) +$$
$$x(4m+3, 4n+2) + x(4m+3, 4n+3)]$$

$$= \frac{1}{8}\sum_{u=0}^{7}\sum_{v=0}^{7} a(u)b(v)X'(u,v)\cos\frac{(2m+1)u\pi}{4}\cos\frac{(2n+1)u\pi}{4}$$

$$\frac{1}{8}\sum_{u=0}^{1}\sum_{v=0}^{1} a(u)b(v)X'(u,v)\cos\frac{(2m+1)u\pi}{4}\cos\frac{(2n+1)u\pi}{4}$$

$$m, n = 0, 1.$$

where:

X(u,v) is the DCT coefficient in the u-th row and v-th column of an 8×8 DCT block, x(m,n) is the pixel value in the m-th row and n-th column of an 8×8 "full-size" image block represented by the DCT block, R(m,n) is the pixel value in the m-th row and n-th column of a resultant 2×2 reduced-sized image block.

$$a(u) = \begin{cases} 1, & u = 0 \\ \sqrt{2}, & \text{otherwise} \end{cases}, b(v) = \begin{cases} 1, & \text{when } v = 0 \\ \sqrt{2}, & \text{otherwise} \end{cases}$$

$$\text{and } X'(u, v) = X(u, v)\cos\frac{u\pi}{16}\cos\frac{u\pi}{8}\cos\frac{v\pi}{16}\cos\frac{v\pi}{8}.$$

(5)

Equations (24) are essentially the same as equations (22) except that modified DCT coefficients are employed. The modified DCT coefficients are as follows:

$$y_{00}'=y_{00}, y_{01}'=0.9061y_{01}, y_{10}'=0.9061y_{10},$$
$$y_{11}'=0.821y_{11}. \quad (25)$$

where $y_{uv}'$ is a modified DCT coefficient derived from an unmodified DCT coefficient $y_{uv}$.

One-sixteenth reduced-sized images can be produced from frame DCT coded I-frames by applying equations (22) with the modified DCT coefficients of equations (25).

V. One-Sixteenth Reduced-Sized Image from I-Frame Coded as Field DCT

The present inventive technique, as applied to field DCT coded I-frames, involves reducing the S horizontal resolution of a 8×8 block by ¼ and the vertical resolution by ½ as shown and described hereinabove with respect for FIG. 6B. This produces four 4×2 reduced-sized images for each macroblock which can be used to produce two one-sixteenth reduced-sized images.

FIG. 17B is a diagram illustrating an 8×8 DCT block 1710B comprising 64 DCT coefficients $y_{uv}$(u,v=0, 1, 2, ..., 7. u,v are row and column numbers, respectively) and two a 2×2 reduced-size top and bottom field block images 1720B and 1720C, each comprising four pixel values $R_{xy}$, ($R_{00}$, $R_{01}$, $R_{10}$ and $R_{11}$ for the top field image 1720B and $R_{20}$, $R_{21}$, $R_{30}$ and $R_{11}$ for the bottom field image 1720C; where 'x' and 'y' are horizontal and vertical pixel positions, respectively). The pixel values for the 4×2 reduced-size images 1720B and 1720C are obtained by performing 2-point IDCTs horizontally and 4-point IDCTs vertically on selected DCT coefficients of the 8×8 DCT block 1710B, as follows:

$$R_{00} = \frac{1}{8}\sum_{u=0}^{3}\sum_{v=0}^{1} a(u)b(v)Y(u,v)\cos\frac{u\pi}{8}\cos\frac{v\pi}{4} = \frac{1}{8}(A+E) \quad (26)$$

$$R_{01} = \frac{1}{8}\sum_{u=0}^{3}\sum_{v=0}^{1} a(u)b(v)Y(u,v)\cos\frac{u\pi}{8}\cos\frac{3v\pi}{4} = \frac{1}{8}(C+G)$$

$$R_{10} = \frac{1}{8}\sum_{u=0}^{3}\sum_{v=0}^{1} a(u)b(v)Y(u,v)\cos\frac{3u\pi}{8}\cos\frac{v\pi}{4} = \frac{1}{8}(B+F)$$

$$R_{11} = \frac{1}{8}\sum_{u=0}^{3}\sum_{v=0}^{1} a(u)b(v)Y(u,v)\cos\frac{3u\pi}{8}\cos\frac{3v\pi}{4} = \frac{1}{8}(D+H)$$

$$R_{20} = \frac{1}{8}\sum_{u=0}^{3}\sum_{v=0}^{1} a(u)b(v)Y(u,v)\cos\frac{5u\pi}{8}\cos\frac{v\pi}{4} = \frac{1}{8}(B-F)$$

$$R_{21} = \frac{1}{8}\sum_{u=0}^{3}\sum_{v=0}^{1} a(u)b(v)Y(u,v)\cos\frac{5u\pi}{8}\cos\frac{3v\pi}{4} = \frac{1}{8}(D-H)$$

$$R_{30} = \frac{1}{8}\sum_{u=0}^{3}\sum_{v=0}^{1} a(u)b(v)Y(u,v)\cos\frac{7u\pi}{8}\cos\frac{v\pi}{4} = \frac{1}{8}(A-E)$$

$$R_{31} = \frac{1}{8}\sum_{u=0}^{3}\sum_{v=0}^{1} a(u)b(v)Y(u,v)\cos\frac{7u\pi}{8}\cos\frac{3v\pi}{4} = \frac{1}{8}(C-G).$$

where $A=y_{00}+y_{01}+y_{20}+y_{21}, B=y_{00}+y_{01}-y_{20}-y_{21}$ $C=y_{00}-y_{01}+y_{20}-y_{21}, D=y_{00}-y_{01}-y_{20}+y_{21}$ $E=1.307(y_{10}+y_{11})+0.541(y_{30}+y_{31}), F=0.541(y_{10}+y_{11})-1.307(y_{30}+y_{31})$ $G=1.307(y_{10}-y_{11})+0.541(y_{30}-y_{31}), H=0.541(y_{10}-y_{11})-1.307(y_{30}-y_{31})$ $$a(u) = \begin{cases} 1, & u = 0 \\ \sqrt{2}, & \text{otherwise} \end{cases}, b(v) = \begin{cases} 1, & v = 0 \\ \sqrt{2}, & \text{otherwise} \end{cases}.$$

Either the top or bottom field of a field DCT coded macroblock can be used to produce one-sixteenth reduced-sized images. The computation of pixel values for a one-sixteenth reduced-sized image block from a field DCT coded 8×8 block requires 12 additions, 4 multiplications and 4 shifts as shown in equation (26).

An alternative method for producing one-sixteenth reduced-sized images from a field DCT coded I-frame is to use a modified IDCT kernel. The 4:1 horizontal reduction can be accomplished by applying the 4-point IDCT of equations 23. The vertical 2:1 reduction can be accomplished as follows:

$$R(n) = \frac{1}{2}[x(2n) + x(2n+1)] \quad (27)$$

$$= \frac{1}{2}\sum_{k=0}^{7} \frac{a(k)}{\sqrt{8}} X(k)\left[\cos\frac{(4n+1)k\pi}{16} + \cos\frac{(4n+3)k\pi}{16}\right]$$

$$= \sum_{k=0}^{7} \frac{a(k)}{\sqrt{8}} X(k)\cos\frac{k\pi}{16}\cos\frac{(2n+1)k\pi}{8}$$

$$\approx \sum_{k=0}^{3} \frac{a(k)}{\sqrt{8}} X(k)\cos\frac{k\pi}{16}\cos\frac{(2n+1)k\pi}{8}$$

$$= \sum_{k=0}^{3} \frac{a(k)}{\sqrt{8}} X'(k)\cos\frac{(2n+1)k\pi}{8} \quad n = 0, 1, 2, 3.$$

where:

$X(k)$ is the $k^{th}$ linear 8-point DCT coefficient $x(n)$ is the $n^{th}$ pixel in a "full size" 8-pixel linear image represented by the DCT array, $R(n)$ is the $n^{th}$ pixel value of a 2 pixel reduced-size linear image $$a(k) = \begin{cases} 1, & \text{when } k = 0 \\ \sqrt{2}, & \text{otherwise} \end{cases} \text{ and } X'(k) = X(k)\cos\frac{k\pi}{16}.$$

Applying the modified 4-point IDCT of equations (23) and the 2-point modified IDCT of equations (27) in sequence yields the following composite asymmetrical modified 4×2 point IDCT:

$$R(m, n) = \frac{1}{8}[x(4m, 2n) + x(4m, 2n+1) + x(4m+1, 4n) + \qquad (28)$$
$$x(4m+1, 4n+1) + x(4m+2, 4n) +$$
$$x(4m+2, 4n+1) + x(4m+3, 4n) + x(4m+3, 4n+1)]$$
$$= \frac{1}{8}\sum_{u=0}^{7}\sum_{v=0}^{7} a(u)b(v)X'(u,v)\cos\frac{(2m+1)u\pi}{8}\cos\frac{(2n+1)v\pi}{4}$$
$$\approx \frac{1}{8}\sum_{u=0}^{3}\sum_{v=0}^{1} a(u)b(v)X'(u,v)\cos\frac{(2m+1)u\pi}{8}\cos\frac{(2n+1)v\pi}{4}$$
$$m = 0, 1, 2, 3 \quad n = 0, 1.$$

where:
X(u,v) is the DCT coefficient in the u-th row and v-th column of an 8×8 DCT block,
x(m,n) is the pixel value in the m-th row and n-th column of an 8×8 "full-size" image block represented by the DCT block,
R(m,n) is the pixel value in the m-th row and n-th column of a resultant 2×2 reduced-sized image block.

$$a(u) = \begin{cases} 1, & u = 0 \\ \sqrt{2}, & \text{otherwise} \end{cases}, \quad b(v) = \begin{cases} 1, & v = 0 \\ \sqrt{2}, & \text{otherwise} \end{cases}$$
$$\text{and } X'(u, v) = X(u, v)\cos\frac{u\pi}{16}\cos\frac{u\pi}{8}\cos\frac{v\pi}{16}.$$

Equations (28) are essentially the same as equations (26) except that modified DCT coefficients are employed. The modified coefficients are:

$$y_{00}' = y_{00}, y_{01}' = 0.9808 y_{01}, y_{10}' = 0.9061 y_{10},$$
$$y_{11}' = 0.8887 y_{11},$$

$$y_{20}' = 0.6533 y_{20}, y_{21}' = 0.6407 y_{21}, y_{30}' = 0.3182 y_{30},$$
$$y_{31}' = 0.3121 y_{31} \qquad (29)$$

where $y_{uv}'$ is a modified DCT coefficient derived from an unmodified DCT coefficient $y_{uv}$.

One-sixteenth reduced-sized image from an I-frame coded as field DCT can be produced by applying equations (26) using the modified DCT coefficients shown in (29).

VI. Reducing Chrominance Components

It is known that the human eye perceives luminance information (grayscale) at much higher resolution than it perceives color. Accordingly, most video encoding standards encode luminance and chrominance information separately, with the luminance information encoded at a relatively higher resolution to produce perceived image sharpness, while the chrominance (color) information is encoded at much lower resolution. Close examination of such images would show some degree of color "bleed", but the human eye does not perceive this at normal viewing distances. According to the present inventive technique, this perceptual phenomenon is used to advantage in reducing the amount of computation required to process chrominance information.

According to the present inventive technique, a computational advantage is realized by reducing chrominance information by twice as great a linear reduction ration (four times greater by area) as luminance information. For chrominance information, 1-point IDCTs are performed in both horizontal and vertical directions to produce an 8:1 linear reduction (64:1 by area), yielding single-pixel chrominance values.

Next, the resultant single-pixel chrominance values are replicated by 2:1 in both horizontal and vertical to produce a 2×2 pixel chrominance block.

FIG. 18 is a diagram showing chrominance processing for reducing the size of a representative 8×8 DCT block 1810 of chrominance coefficients $y_{xy}$. By the method described above, the 8×8 block 1810 is reduced to a single chrominance value 1820 ($R_{00}$). This chrominance value 1820 is then replicated to produce a 2×2 pixel chrominance block 1820A with each pixel of the chrominance block having the same value $R_{00}$. The 8×8 chrominance DCT block 1810 comprises 64 chrominance DCT coefficients $y_{uv}$ (u,v=0, 1, 2, ..., 7; u,v are row and column numbers, respectively). Only DC values are required to perform 1-point IDCTs. The 1-point IDCT can be expressed as follows:

$$R_{00} = \frac{1}{8} y_{00}. \qquad (30)$$

This technique needs only 1 shift and data assignment per chrominance reduction. If a reduced-sized image is used as a reference frame for motion compensation, the memory space required for storing chrominance components of the reference frame would be reduced by a factor of four.

VII. Fast Construction of Visual Rhythm

Visual rhythm is a technique whereby a two-dimensional image representing a complete motion video stream is constructed. A video stream is essentially a temporal sequence of two-dimensional images, the temporal sequence thereof providing an additional dimension—time. The visual image methodology uses selected pixel values from each frame, typically along a sampling path (usually values along a horizontal, vertical or diagonal line in the frame) as line images, stacking the line images from subsequent frames alongside one another to produce a two-dimensional representation of a motion video sequence. The resultant image exhibits distinctive patterns—the "visual rhythm" of the video sequence—for many types of video editing effects, especially for all wipe-like effects which manifest themselves as readily distinguishable lines or curves.

The construction of a visual rhythm image for a video stream is ordinary very time-consuming and compute-intensive. The present inventive technique for extracting half DC and DC values can be advantageously applied to visual rhythm, thereby minimizing the amount of computation required and improving the speed with which visual rhythm images can be constructed.

The visual rhythm of a video is a single image, that is, a two-dimensional abstraction of the entire content of the video constructed by sampling a specific group of pixels of each image sequence and temporally accumulating the samples along time. Each vertical column of pixels in the visual rhythm image of a video consists of the pixels sampled from a single frame. The next column to the left in the visual rhythm image contains the sampled pixels from a previous frame of the video and the next column to the right contains the sampled pixels from a subsequent frame of the video, and so on.

FIGS. 19A, 19B and 19C are diagrams illustrating three different sampling strategies for visual rhythm.

In FIG. 19A, a complete video is conceptually represented as a rectangular extrusion 1910, representing a 3-dimensional compilation of a sequence of 2-dimensional images that make up the video such. A front face 1910A of the extrusion 1910 represents a first frame of the video, a back face 1910B of the extrusion 1910 represents a last frame of the video, and any perpendicular cross-section 1910C taken through the extrusion 1910 represents a corresponding frame within the sequence of frames. "X" and "Y" dimensions of the front face 1910A of the extrusion represent image coordinates within the video. Conceptually, then, if one were to view the front face 1910A directly, one would expect to see the contents of the first frame of the video.

A horizontal line 1920A represents a linear sampling path across an image in the video, and it is the image pixels that lie along this sampling path that will be sampled to create the visual rhythm of the video. The same sampling path is used for each subsequent frame of the video, thereby effectively creating a horizontal plane image 1930A that is the visual rhythm image for the video.

FIG. 19B is the same as FIG. 19A, except that a vertical sampling path 1920B is used, producing a vertical plane image 1930B as a visual rhythm image, as shown.

FIG. 19C is the same as FIGS. 19A and 19B, except that a diagonal sampling path 1920C is used, creating a diagonal plane image 1930C as a visual rhythm image, as shown.

The horizontal, vertical and diagonal sampling paths 1920A, 1920B, and 1920C of FIGS. 19A–19C are merely examples of many possible sampling paths that can be used to construct a visual rhythm image. Those of ordinary skill in the art will understand that numerous sampling strategies are possible.

All visual rhythms described hereinbelow will be assumed to have been constructed using a diagonal sampling line of the type shown and described with respect to FIG. 19C. Diagonal sampling provides visual rhythm images that exhibit particularly clear patterns for certain video effects. However, the present inventive technique is readily adapted to any type of visual rhythm sampling strategy.

FIG. 20A is a diagram showing a portion 2000A of a visual rhythm image. Each vertical line in the visual rhythm image is generated from a frame of the video, as described above. As the video is sampled, the image is constructed, line-by-line, from left to right Distinctive patterns in the visual rhythm indicate certain specific types of video effects. In FIG. 20A, straight vertical line discontinuities 2010A, 2010B, 2010C, 2010D, 2010E, 2010F, 2010G and 2010H in the visual rhythm portion 2000A indicate "cuts", where a sudden change occurs between two scenes (e.g., a change of camera perspective). Wedge-shaped discontinuities 2020A, 2020A, 2020C and 2020D, and diagonal line discontinuities 2020B and 2020E indicate various types of "wipes" (e.g., a change of scene where the change is swept across the screen in any of a variety of directions).

FIG. 20B is a diagram showing another portion 2000B of a visual rhythm image. In FIG. 20B, as in FIG. 20A straight vertical line discontinuities 2010J, 2010K, 2010I, 2010M, 2010N, 2010O, 2010P and 2010Q in the visual rhythm portion 2000B indicate "cuts". Gradual transitions to and from a solid color, as shown at 2030A, 2030B, 2030C and 2030D indicate "fades". Gradual transitions from one vertical pattern to another as shown at 2040A, 2040B and 2040C indicate "dissolves".

FIG. 20C is a diagram showing another portion 2000C of a visual rhythm image. In FIG. 20C, as in FIGS. 20A and 20B, straight vertical line discontinuities 2010R, 2010S, 2010T, 2010U, 2010V, 2010W and 2010X in the visual rhythm portion 2000C indicate "cuts". Outward sweeping patterns 2050A and 2050B indicate "zoom in" effects. Inward sweeping patterns 2050C and 2050D indicate "zoom out" effects. A coherent wavy pattern 2060 within an otherwise stable pattern indicates object motion. Narrow, bright vertical bars 2070 indicate "flashlight" effects.

FIGS. 20D, 20E and 20F are line diagram versions of FIGS. 20A, 20B and 20C, respectively, with gray-scale omitted. In FIGS. 20D, 20E and 20F the numbers are the same as in FIGS. 20A, 20B and 20C, but are primed (have an apostrophe following the number).

In the terminology of video compression, any compression technique that employs only spatial redundancy is referred to as "intraframe" coding, and frames coded in this manner are called "intra-coded" frames. Most video codecs (enCOer/DECoders) employ either spatial or transform domain block-based coding for intraframe coding to reduce spatial redundancy. For example, the compression scheme used by the various MPEG standards (i.e., MPEG-1, MPEG2, MPEG-4, etc.) employs a discrete cosine transform (DCT) to transform frame images in discrete units of 8×8 pixel blocks. This means that each decoded block (each DCT block processed by an inverse DCT transform) yields a single 8×8 pixel portion of a frame, independent of all other portions of the frame. This is true for any block-based compression scheme, regardless of the specific compression technique (DCT, discrete wavelet transform, vector quantization, etc.). In fact, if one is interested in the value of only one pixel of a frame, it is only necessary to decode the single block in which the pixel of interest is encoded—a very limited mathematical operation in comparison to that required to decode an entire frame.

In order to further improve compression ratios, most video codecs further employ techniques that take advantage of temporal redundancy between frames known in the video compression art as "interframe" coding (predictive, interpolative). Interframe coded frames are commonly referred to as "inter-frames". The interframe coding technique employed by the MPEG-2 standard refers to and encodes incrementally relative to N×M pixel "anchor" blocks in a reference "intraframe" image that best matches (according to predetermined criteria) the visual characteristics of corresponding blocks in the "inter-frame". The encoding of positional changes between the reference "anchor" block and the inter-frame block that references it is known as "motion compensation". In the case of MPEG-2 encoding, N=M=16. Each 16×16 block is referred to as a "macroblock".

However, the present inventive technique is not restricted to this N×M rectangular geometry. Instead, it is assumed that the geometry of the "anchor" block in the reference intraframe need not have the same as the geometry as the incrementally encoded block in the inter-frame that references it, since frame images in the "real world" undergo scale changes as well as rotation and warping between frames of a video stream.

Since the visual rhythm technique described hereinabove requires only a selected subset of the pixels in each frame, an efficient way to only decode those pixels required to construct the visual rhythm of a hybrid-encoded video (i.e., both intraframe and interframe coded, e.g., MPEG-2 coded) can be accomplished as follows:

1. Decode all the blocks for the frame which can be used as a reference frame for motion compensation. For the frames which can not be used as a reference frame for motion compensation, decode only the blocks containing at least one pixel along a predetermined visual rhythm sampling path (horizontal line, vertical line, diagonal line or other sampling path)
2. Obtain the pixel values for constructing the visual rhythm from the decoded blocks.

For example, for MPEG-2 compression, all types of frames (I-frame, P-frame, and B-frames) cannot be encoded using motion-compensation "prediction" relative to any B-frames. Therefore, to construct a visual rhythm, all the blocks in I-frame and P-frame needs to be decoded where only the blocks which contain pixels along the visual rhythm sampling path need to be decoded for B-frames. All B-frames described hereinbelow will be assumed to signify a frame which can not be used as a reference frame for motion compensation FIG. 21 is a diagram of a frame 2100 comprising a plurality of encoded blocks 2110. A horizontal line visual rhythm sampling path 2120 is defined that runs through the frame 2110, intersecting a shaded subset 2130 of the encoded blocks 2110. Even though all the blocks need to be decoded for I-frames and P-frames, it is only necessary to decode the subset blocks 2130 intersected by the visual rhythm's sampling path 2120 for B-frames to construct a visual rhythm for the video stream. For visual rhythm purposes, it is not necessary to decode any blocks (2110) other than the intersected blocks 2130 for B-frames.

The method for producing reduced-sized DC or half DC images for I-frames, P-frames, and B-frames described hereinabove is readily adapted to the construction of visual rhythm images. Since visual rhythm sampling strategies typically use only a portion of the pixels along the visual rhythm sampling path, reduced-sized images, are well-suited to visual rhythm sampling. This means that the DC or half DC value can used as a block sample pixel value, provided that accurate geometric compliance to a visual rhythm path is not required. If, for example, it is sufficient to sample only one pixel per shaded block 2130 in FIG. 21, then it is only necessary to retrieve DC or half DC values for each shaded block 2130. As efficient as the reduced-size image production techniques described hereinabove are, visual rhythm generation based upon reduced-size images can be even more efficient, since only those pixels of the reduced-size image that lie along the visual rhythm sampling path are required for B-frames.

Although all types of frames (I-frames, P-frames, B-frames) constituting a video stream could be used for constructing a visual rhythm, to further reduce the computation only the Intra-coded frames (I-frames) could be used to construct a visual rhythm. In such case, each vertical column of pixels in the visual rhythm image of a video consists of the pixels sampled from only the I-frames. In such cases it is only necessary to decode the blocks or obtain the reduced-size blocks by partially decoding the blocks intersected by the visual rhythm's sampling path in I-frames.

FIG. 22 is a diagram showing a reduced-size image 2200 reduced by the method described hereinabove comprising a plurality of reduced-size pixels 2210 in a rectangular array 23 pixels wide by 12 pixels high. A horizontal line visual rhythm sampling path 2220 is defined, and a shaded set of reduced-size pixels 2230 on an around the horizontal line are identified. For visual rhythm purposes, only the shaded reduced-size pixels 2230 are required for B-frame in case the visual rhythm is constructed from all types of frames. In case the visual rhythm is constructed from only I-frames, meaning that it is unnecessary to obtain the unshaded reduced-size pixels 2210. In case of MPEG-1 and MPEG-2, the use of the "slice start code" of MPEG-1 and MPEG-2 encoding facilitates the identification of the vertical position of macroblocks, simplifying the identification of which blocks can be skipped in constructing visual rhythms. Therefore, in the case that a horizontal line visual rhythm sampling path 2220 is defined, we can efficiently skip the macroblocks which contain the blocks which can be ignored and need not to be computed.

FIG. 23 is a block diagram illustrating an embodiment of the invention for a digital video recorder (DVR). The memory RAM 2312 is supplied with an MPEG-2 data video stream, for storage. The video stream may be one of multiple (e.g., two) video streams, which may be received by several tuners or a network connection, routed to the RAM by a switcher (not shown). The DVR further comprises a memory unit (HDD) 2310 and a CPU 2314. Reduced images are readily generated from recorded or received video stream through a suitable derivation algorithm utilizing the CPU 2314 or, alternatively, the thumbnail generator 2322 dedicated for generating reduced-sized images rather than decoding full-sized video frames. This figure illustrates one possible approach to solving the problem of watching one program which is decoded by decoder 2324 while also generating and viewing thumbnail images from a thumbnail generator 2322. Images are buffered by a display buffer 2332 and displayed on a display device 2320. For concurrently displaying two images, the decoded frames may be displayed concurrently in the form of (picture-in-picture) PIP, on the display device 2320.

The present invention may be utilized to provide a "partial" (or "low-cost") video decoder for generating reduced-size images (thumbnails), in lieu of a "full" decoder. Typically, a single "full decoder" parses only one video stream (although some of the current MPEG-2 decoder chips can parse multiple video streams). A full decoder implemented in either hardware or software fully decodes the I-,P-,B-frames in compressed video such as MPEG-2, and is thus computationally expensive. The "low cost" or "partial" decoder which is enabled by the present invention suitably only partially decodes the desired temporal position of video stream by utilizing only a few coefficients in compressed domain without fully decompressing the video stream. The low cost decoder could also be a decoder which partially decodes only an I-frame near the desired position of video stream by utilizing only a few coefficients in compressed domain which is enough for the purpose of browsing and summary. An advantage of using the low cost decoder is that it is computationally inexpensive, and can be implemented in low-cost. Additionally, such a low-cost decoder can be advantageous because, typically, a full decoder cannot be used to play the video while generating thumbnails. To solve the problem, set-top boxes (STBs) typically pre-generate thumbnails and store them, and thus they need to manage the image files. Also, the thumbnail images generated from the output of the full decoder are sometime distorted. A benefit of a low-cost decoder is that the generation of (reduced) I frames without also decoding P and B frames is enough for a variety of purposes such as video browsing. The invention may be implemented in hardware and/or software.

The present inventive technique is not limited to block-based encoding schemes that encode 8×8 blocks of pixels. Those of ordinary skill in the art will recognize that the present inventive scheme is readily adapted to work with blocks of any size. For example, if a particular encoding/compression scheme uses transformed block size of 4×4, top DC, bottom DC and DC values are readily calculate for the 4×4 blocks.

Although described herein in terms of DCT and IDCT transformation techniques, the present inventive technique is readily applied to other transform types such as discrete wavelet transforms, modified IDCT techniques, etc.

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein. A number of examples of such "variations" have been set forth hereinabove.

What is claimed is:

1. A method for producing reduced-size images from a video stream, comprising:
   selecting a reduced set of transform coefficients from each of a plurality of macroblocks by discarding higher-frequency coefficients in response to a reduction factor; and
   performing an inverse transformation and field separation process on the selected coefficients to produce reduced-size top-field and bottom-field image blocks.

2. A method according to claim 1, wherein:
   the reduced set of transform coefficients comprises at least one transform coefficient from each of the plurality of macroblocks.

3. A method according to claim 1, further comprising:
   retrieving the reduced set of transform coefficients by performing the additional steps of:
   decoding the macroblocks to produce the reduced set of transform coefficients in a quantized form; and
   dequantizing the reduced set of transform coefficients.

4. A method according to claim 1, wherein:
   the reduction factor is expressed as a ratio M/N, where:
   M and N are both positive, nonzero integers; and
   M is less than N.

5. A method according to claim 4, wherein:
   each macroblock further comprises a plurality of transform blocks, each transform block comprising an N×N array of transform coefficients.

6. A method according to claim 5, wherein:
   the transform coefficients are Discrete Cosine Transform (DCT) coefficients.

7. A method according to claim 5, wherein:
   the macroblocks are field DCT encoded; and
   the selected set of transform coefficients comprises 2M×M arrays of transform coefficients from each of a plurality of transform blocks.

8. A method according to claim 5, wherein:
   the macroblocks are frame DCT encoded; and
   the selected set of transform coefficients comprise M×M arrays of transform coefficients from each of a plurality of transform blocks.

9. A method according to claim 1, wherein:
   the reduced-size image comprises a frame image.

10. A method according to claim 1, wherein:
    the reduced-size image comprises a field image.

11. The method of claim 1, wherein each macroblock comprises at least two blocks.

12. A method according to claim 1, wherein the macroblocks lie along a sampling path of a video frame, and the reduced size image is a line image, and further comprising:
    producing a visual rhythm image of the video stream by stacking a plurality of line images alongside one another.

13. The method of claim 1, utilized for at least one of video browsing, video summary, fast thumbnail playback and video indexing.

14. A device being arranged for executing a method as claimed in claim 1.

15. A thumbnail generator comprising:
    means for determining a reduction factor for a reduced size image;
    means, responsive to said reduction factor, for selecting a reduced set of transform coefficients from each of a plurality of macroblocks by discarding higher-frequency coefficients; and
    means for performing an inverse transformation and field separation process on the selected coefficients to produce reduced-size top-field and bottom-field image blocks.

16. A system according to claim 15, further comprising:
    means for adjusting the reduced-size image pixel values according to motion vector information within the video stream.

17. A system according to claim 15, wherein:
    the video stream is an MPEG-2 video stream.

18. A computer readable medium carrying a set of instructions which, when performed, execute a method comprising:
    selecting a reduced set of transform coefficients from each of a plurality of macroblocks by discarding higher-frequency coefficient in response to a reduction factor; and
    performing an inverse transformation and field separation process on the selected coefficients to produce reduced-size top-field and bottom-field image blocks.

* * * * *